US011002625B2

(12) United States Patent
Noh et al.

(10) Patent No.: US 11,002,625 B2
(45) Date of Patent: May 11, 2021

(54) MULTI-AXIS FORCE SENSOR

(71) Applicant: King's College London, London (GB)

(72) Inventors: Yohan Noh, London (GB); Joao Bimbo, Genoa (IT); Hongbin Liu, London (GB)

(73) Assignee: King's College London, London (GB)

(*) Notice: Subject to any disclaimer, the term of this patent is extended or adjusted under 35 U.S.C. 154(b) by 11 days.

(21) Appl. No.: 16/340,020

(22) PCT Filed: Oct. 3, 2017

(86) PCT No.: PCT/GB2017/052966
§ 371 (c)(1),
(2) Date: Apr. 5, 2019

(87) PCT Pub. No.: WO2018/065765
PCT Pub. Date: Apr. 12, 2018

(65) Prior Publication Data
US 2020/0049579 A1 Feb. 13, 2020

(30) Foreign Application Priority Data
Oct. 7, 2016 (GB) ..................................... 1617097

(51) Int. Cl.
*G01L 5/16* (2020.01)
*G01L 5/166* (2020.01)
*G01L 5/00* (2006.01)

(52) U.S. Cl.
CPC .............. *G01L 5/166* (2013.01); *G01L 5/009* (2013.01)

(58) Field of Classification Search
CPC ......... G01L 3/12; G01L 3/1421; G01L 5/105; G01L 5/226; G01L 5/228; G01L 5/166; G01L 5/22–228; G01L 5/16–173
See application file for complete search history.

(56) References Cited

U.S. PATENT DOCUMENTS 3,492,864 A * 2/1970 Carothers ............ G01G 3/1408
73/862.042
3,729,990 A 5/1973 Oliver
(Continued)

FOREIGN PATENT DOCUMENTS

CN 2221208 Y 2/1996
CN 102087153 A 6/2011
(Continued)

OTHER PUBLICATIONS

Mar. 15, 2016. Y. Noh et al., "Three-Axis Fiber-Optic Body Force Sensor for Flexible Manipulators," in IEEE Sensors Journal, vol. 16, No. 6, pp. 1641-1651.
(Continued)

*Primary Examiner* — Tran M. Tran
(74) *Attorney, Agent, or Firm* — Banner & Witcoff, Ltd.

(57) ABSTRACT

Aspects described herein provide structures for a force sensor, and force sensors using such structures, which are compact and easy to manufacture, for example by 3D printing. In particular the structures comprise a pair of stacked ring sensor elements, the ring sensor elements in turn being formed by upper and lower ring elements joined together at points around the circumference thereof by resiliently mounted connection bars. The connection bars may extend in the same plane as the rings, in which case sensitivity to torque about the axis of the rings is much reduced, such that a five-axis sensor is effectively obtained, or the connection bars may extend obliquely between the upper and lower rings of each sensor element, such that they have a directional component in the direction of the axis of the rings (the rings of each element being co-axially stacked). In this second case application of a torque about the ring axis causes the oblique connection bars to either increase or decrease their directional component in the axial (Continued)

direction, thus providing sensitivity to torque about the axis, and providing a compact six axis sensor.

10 Claims, 35 Drawing Sheets

(56) References Cited

U.S. PATENT DOCUMENTS

| | | | |
|---|---|---|---|
| 4,094,192 A * | 6/1978 | Watson | G01L 5/161 |
| | | | 338/2 |
| 4,488,441 A | 12/1984 | Ramming | |
| 4,573,362 A * | 3/1986 | Amlani | G01L 1/2218 |
| | | | 73/862.044 |
| 4,577,513 A * | 3/1986 | Harwood | G01L 3/1457 |
| | | | 414/730 |
| 4,680,465 A | 7/1987 | Stevens | |
| 4,695,963 A | 9/1987 | Sagisawa et al. | |
| 4,712,431 A * | 12/1987 | Hatamura | G01L 1/2218 |
| | | | 73/862.042 |
| 4,763,531 A * | 8/1988 | Dietrich | G01L 5/161 |
| | | | 73/862.044 |
| 4,911,024 A * | 3/1990 | McMaster | G01L 5/161 |
| | | | 73/862.044 |
| 5,490,427 A * | 2/1996 | Yee | G01L 5/161 |
| | | | 73/767 |
| 5,648,617 A * | 7/1997 | Cullen | G01L 1/2231 |
| | | | 73/862.042 |
| 5,889,214 A * | 3/1999 | Kang | G01L 5/161 |
| | | | 73/862.044 |
| 5,925,832 A * | 7/1999 | Bruns | G01L 1/048 |
| | | | 73/862.632 |
| 6,550,346 B2 * | 4/2003 | Gombert | G01L 5/166 |
| | | | 250/208.6 |
| 6,928,886 B2 * | 8/2005 | Meusel | G01B 11/002 |
| | | | 73/862.324 |
| 7,057,154 B2 * | 6/2006 | Kitamura | G01L 5/166 |
| | | | 250/221 |
| 7,174,792 B2 * | 2/2007 | Ealey | G01D 5/25 |
| | | | 73/862.041 |
| 7,296,481 B2 * | 11/2007 | Kahle | G01F 1/80 |
| | | | 73/856 |
| 7,437,954 B2 * | 10/2008 | Sakano | G01L 5/161 |
| | | | 73/862.043 |
| 8,965,577 B2 * | 2/2015 | Arimitsu | G01L 5/166 |
| | | | 700/258 |
| 9,186,797 B2 * | 11/2015 | Kim | A61B 34/30 |
| 9,200,969 B2 * | 12/2015 | Ueno | G01L 5/16 |
| 9,274,014 B2 * | 3/2016 | Janik | G01L 5/16 |
| 9,671,298 B2 * | 6/2017 | Sawada | B25J 9/1697 |
| 9,675,781 B2 * | 6/2017 | Ataollahi | A61M 25/0147 |
| 9,719,868 B2 * | 8/2017 | Sarakoglou | G01L 1/2206 |
| 9,989,427 B2 * | 6/2018 | Teshigawara | G01L 5/166 |
| 10,001,419 B2 * | 6/2018 | Kolbenschlag | F16F 1/18 |
| 10,022,190 B2 * | 7/2018 | Valsamis | G01B 11/18 |
| 10,078,026 B2 * | 9/2018 | Vinogradov-Nurenberg | |
| | | | G01L 5/161 |
| 10,239,213 B1 * | 3/2019 | Reich | B25J 13/085 |
| 10,274,386 B2 * | 4/2019 | Shafer | G01J 1/4228 |
| 10,583,570 B2 * | 3/2020 | Ogata | B25J 19/027 |
| 2013/0239701 A1 * | 9/2013 | Huang | G01L 1/22 |
| | | | 73/862.045 |
| 2016/0178458 A1 | 6/2016 | Kolbenschlag et al. | |
| 2019/0162612 A1 * | 5/2019 | Sakano | G01L 1/142 |
| 2019/0310142 A1 * | 10/2019 | Kim | G01D 5/2417 |

FOREIGN PATENT DOCUMENTS

| | | |
|---|---|---|
| CN | 102095534 A | 6/2011 |
| CN | 102501245 A | 6/2012 |
| CN | 102589765 A | 7/2012 |
| CN | 103528746 A | 1/2014 |
| CN | 103698076 A | 4/2014 |
| CN | 103940544 A | 7/2014 |
| CN | 104568279 A | 4/2015 |
| CN | 104625060 A | 5/2015 |
| CN | 105 651 446 A | 6/2016 |
| DE | 102010034713 A1 | 2/2012 |
| EP | D 117 334 A2 | 9/1984 |
| ES | 2342643 A1 | 7/2010 |
| GB | 955761 A | 4/1964 |
| JP | H04 19786 U | 2/1992 |
| JP | H04 32046 U | 3/1992 |
| WO | 2012/153643 A1 | 11/2012 |

OTHER PUBLICATIONS

2014. Y. Noh et al., "A continuum body force sensor designed for flexible surgical robotics devices," 2014 36th Annual International Conference of the IEEE Engineering in Medicine and Biology Society, Chicago, IL, pp. 3711-3714.

Oct. 9, 2016. Noh Yohan et al: "A new miniaturized multi-axis force/torque sensors based on optoelectronic technology and simply-supported beam", 2016 IEEE/RSJ International.

Mar. 5, 2018—ISR & WO—PCT/GB2017/052966.

Jan. 22, 2017—GB Search Report—1617097.9.

Jul. 28, 2020—EP Search and Examination Report—App No. 17783550.1.

* cited by examiner side view section view

Front view

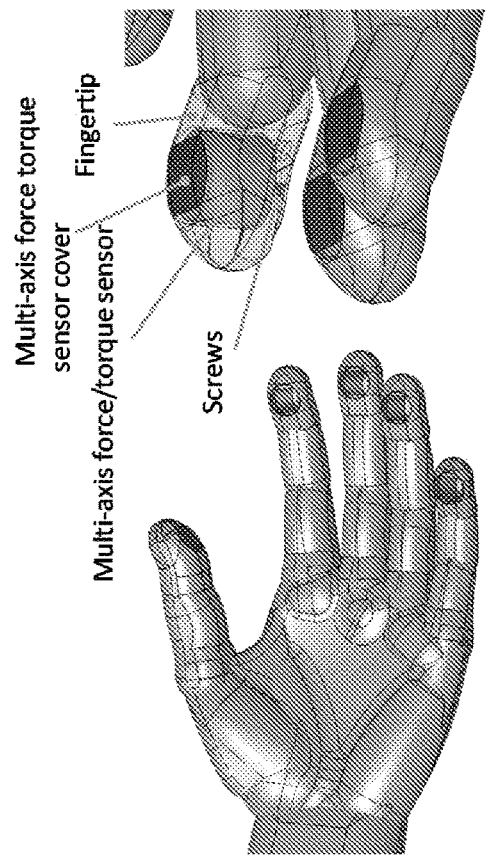
Figure 19
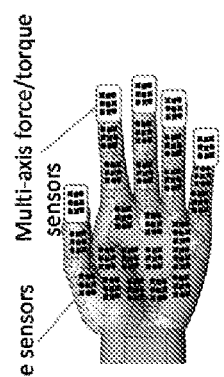
(c)
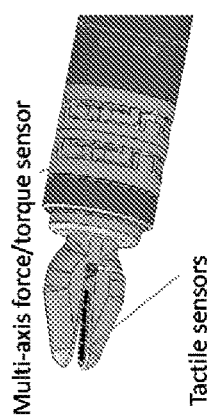
(b)
Figure 20
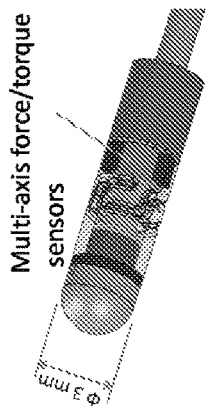
(a)

Front view section view

MULTI-AXIS FORCE SENSOR

CROSS-REFERENCE TO RELATED APPLICATIONS

This application is a U.S. National Stage application under 35 U.S.C. § 371 of International Application PCT/GB2017/052966 (published as WO 2018/065765 A1), filed Oct. 3, 2017, which claims the benefit of priority to Application GB 1617097.9, filed Oct. 7, 2016. Benefit of the filing date of each of these prior applications is hereby claimed. Each of these prior applications is hereby incorporated by reference in its entirety.

TECHNICAL FIELD

Embodiments of the present invention relate to a multi-axis force sensor, and in particular to a sensor that is able to provide force sensing in at least five degrees of freedom (DoF).

BACKGROUND TO THE INVENTION AND PRIOR ART

Multi-axis force sensors that measure multiple degrees of freedom (DoF) are known already, but often take complicated and expensive forms. In a three dimensional Cartesian co-ordinate space there are up to six degrees of freedom that can be measured, being linear force F in each of the x, y, and z directions (i.e. Fx, Fy, and Fz), and also turning moment M about each of the x, y, and z axes (i.e. Mx, My, and Mz). In order to measure all six degrees of freedom previously, it has been necessary to combine multiple 2 or 3 DoF sensors together, usually by having to over-provision the number of sensors, such that overall cost of the resulting sensor is high.

For example, Optoforce, of Budapest, Hungary, provide a three-axis force sensor that uses one LED and four photo diodes to measure three force and torque components (two moments $M_x$ and $M_y$, and one axial force $F_z$). To measure 6-axis force/torque components ($F_x$, $F_y$, $F_z$ $M_x$, $M_y$, $M_z$), three or four units of the three-axis force/torque sensor are currently being combined. For this reason, the six-axis sensor's overall size is bigger (50.0×50.0×25.0 mm³) than the leading commercialised six-axis force/torque sensor available (ATI Industrial Automation: F/T Sensor Nano17 (strain gauges based technology), Φ17×14.5 mm³). Despite the Optoforce sensor's brand name of 'three-axis force sensor', it cannot measure three-axis pure force components ($F_x$, $F_y$, $F_z$), but force and moments. The three-axis force components can be accurately measured only whilst external force is applied around the centre of the top on the semi-sphere surface.

As another example, the Minebea Co., Ltd of Japan supply a 6-axial force sensor for measuring x- and y-directional displacements. The 6-axis sensor comprises three sets of the 3-axial displacement-measuring instruments arranged in 120° rotary symmetric positions. Each 3 axis sensor comprises a light source being an infra-red high bright LED (the product of Stanley Electric Corp., Model BN-401) with a 1.0 mm thick pinhole having the diameter of 0.6 mm, and a photo sensor having a square shaped silicon PIN photodiode having 2.5 mm sides divided into quadrant (the product of Moririka Co., Model MI-33H4D). Light emitted from the source is diffused at passing the pinhole, and the optical sensor unit can then measure minute displacements not only in x and y directions but also in the z-direction. The 3-axis force sensor makes use of this effect, and the combination of three of the three-axis force sensors arranged in a circle 120 degrees apart can measure 6-axis force/torque components. However, again, more than two three axis units (in this case three) are required in order to measure six axes.

In view of the above, there is still a need for a lower cost multiple axis sensor that is able to measure greater than 3 degrees of freedom.

SUMMARY OF THE INVENTION

Embodiments of the invention provide structures for a force sensor, and force sensors using such structures, which are compact and easy to manufacture, for example by 3D printing. In particular the structures comprise a pair of stacked ring sensor elements, the ring sensor elements in turn being formed by upper and lower ring elements joined together at points around the circumference thereof by resiliently mounted connection bars. The connection bars may extend in the same plane as the rings, in which case sensitivity to torque about the axis of the rings is much reduced, such that a five-axis sensor is effectively obtained, or the connection bars may extend obliquely between the upper and lower rings of each sensor element, such that they have a directional component in the direction of the axis of the rings (the rings of each element being co-axially stacked). In this second case application of a torque about the ring axis causes the oblique connection bars to either increase or decrease their directional component in the axial direction, thus providing sensitivity to torque about the axis, and providing a compact six axis sensor.

In view of the above, from a first aspect there is provided a resilient structure for a force sensor, comprising:
  an upper element and a lower element, the upper element being stacked on the lower element;
  the upper element comprising first upper and lower rings substantially parallel to each other in a first plane, the first upper and lower rings being connected to each other by a first plurality of resiliently mounted beam structures extending parallel to the first plane and resiliently mounted at one end to the first upper ring and at the other end to the first lower ring;
  the lower element comprising second upper and lower rings substantially parallel to each other in the first plane, the second upper and lower rings being connected to each other by a second plurality of resiliently mounted beam structures extending parallel to the first plane and resiliently mounted at one end to the second upper ring and at the other end to the second lower ring.

In one embodiment the resiliently mounted beam structures are mounted in pairs between the respective upper and lower rings.

In a further embodiment the resiliently mounted beam structures are equiangularly spaced around the respective upper and lower elements.

Moreover, in a yet further embodiment the upper and lower elements are substantially identical.

In any of the embodiments described above, the first plane is an X-Y plane, the upper element and lower element being stacked one on the other extending in the Z-direction, the resilient structure being able to deflect in response to applied forces in any of the X, Y, or Z directions, and in response to applied turning moments about the X and Y axes. As a consequence, a compact 5-axis sensor is obtained.

The above described resilient structure may be used as part of a force sensor, the force sensor further comprising displacement detection circuitry arranged to detect deflection or movement of the upper or lower sensor elements under an applied force to be sensed.

In one embodiment the displacement detection circuitry comprises a plurality of optical sensors located within the upper and lower elements.

Moreover, in a further embodiment the optical sensors comprise optical sources and reflectors mounted on the structure, the sensors being arranged to detect displacements of the reflectors with respect to the sources due to movement of the structure under an applied force or torque.

From a second aspect, embodiments of the present invention also provide a resilient structure for a force sensor, comprising:

an upper sensor element and lower sensor element, the upper element being stacked on the lower element;

the upper element comprising first upper and lower rings substantially parallel to each other in a first plane, the first upper and lower rings being connected to each other by a first plurality of resilient extensions resiliently mounted at a first end to the first upper ring and at a second end to the first lower ring, the resilient extensions having at least one portion that extends obliquely to the first plane in a first circumferential direction;

the lower element comprising second upper and lower rings substantially parallel to each other in the first plane, the second upper and lower rings being connected to each other by a second plurality of resilient extensions resiliently mounted at a first end end to the second upper ring and at a second end to the second lower ring, the resilient extensions having at least one portion that extends obliquely to the first plane in a second circumferential direction;

the first and second circumferential directions being opposite to each other.

In this aspect, in one embodiment both the first and second circumferential directions have a same orthogonal component to the first plane.

Moreover, in further embodiments the resilient extensions are substantially S shaped or Z shaped.

Alternatively, in other embodiments the resilient extensions are straight beams.

In any of the above described embodiments the resilient extensions may be equiangularly spaced around the respective upper and lower elements.

In the second aspect, in some embodiments the first plane is an X-Y plane, the upper element and lower element being stacked one on the other extending in the Z-direction, the resilient structure being able to deflect in response to applied forces in any of the X, Y, or Z directions, and in response to applied turning moments about any of the X, Y or Z axes. As such, a six axis force sensing structure can be obtained.

The above described resilient structure of the second aspect may further be used as a force sensor, the force sensor further comprising displacement detection circuitry arranged to detect deflection or movement of the upper or lower sensor elements under an applied force to be sensed.

In one embodiment the displacement detection circuitry comprises a plurality of optical sensors located within the upper and lower elements. Moreover, in a further embodiment the optical sensors comprise optical sources and reflectors mounted on the structure, the sensors being arranged to detect displacements of the reflectors with respect to the sources due to movement of the structure under an applied force or torque.

From a yet further aspect, some embodiments of the present invention also provide a force sensor comprising a pair of resilient sensor elements stacked on top of each other in a first sensor axis, a first element of the pair being arranged such that when a first torque about the first sensor axis is applied to the first element the first element twists about the first sensor axis in such a manner as to cause its structure to lengthen slightly along the axis, a second element of the pair being arranged such that when the first torque about the first sensor axis is applied to the second element the second element twists about the first sensor axis in such a manner as to cause its structure to shorten slightly along the axis.

In one embodiment of this further axis, the lengthening and shortening are substantially the same in response to the same applied first torque, such that there is substantially no overall change in length of the force sensor.

In any of the above described embodiments the first and/or second upper and/or lower rings may be any convenient shape, including circular, square, triangular, or polygonal such as octagonal or hexagonal. Whilst a circular shape permits for a substantially equal response from any radial direction, other shapes also provide different advantages, and in particular may give the ability to tune the directional response of the force sensor to give a desired response.

Further features, embodiments, and advantages of the present invention will be apparent from the following description and from the appended claims.

BRIEF DESCRIPTION OF THE DRAWINGS

Embodiments of the invention will now be described with reference to the accompanying drawings, wherein like reference numerals refer to like parts, and wherein:—

FIGS. 19 and 20 are drawings illustrating various uses of the force sensor of the present embodiments;

DESCRIPTION OF EMBODIMENTS

Two embodiments of the invention will be described. The first embodiment makes use of beam structures supported at both ends between upper and lower support rings to allow for movement about all three axes. Two such sensor structures may be provided one on top of the other to provide in total a 5-axis sensor arrangement, the only axis the sensor not being sensitive to being turning moments about the z-axis. The reason for this is that the sensing beam structures are fixed in place in the structure in the X-Y-plane, and have no differential with respect to the Z direction. This means that they cannot meaningfully move within the structure in the X-Y plane and hence are not particularly sensitive to moments about the Z-direction (which would result in a rotation of the X-Y plane). The second embodiment then improves upon the first embodiment by altering the design of the beam structure elements to provide structures that are also sensitive to turning moments about the z-axis, thereby providing a six-axis sensor. This is achieved by angling the beam structures with respect to the X-Y-plane, so that the beams extend in a direction that has a z-axis component. When a turning moment about the z-axis is encountered, then rather than resisting such motion as in the first embodiment, in the second embodiment the respective angled beam structures either flatten out slightly (i.e. reduce their angle to the X-Y plane thus reducing their z-axis component) or become slightly more vertical (i.e. increase their angle to the X-Y plane thus increasing their z-axis component), in both cases permitting the rotational movement about the z-axis. In addition, due to the stacked arrangement providing two layers of such beam structures, if the beam structures extend in the Z direction with opposite X and/or Y components in the respective layers, then each sensor structure will either flatten in the Z direction or extend slightly, depending on the Z axis torque direction applied, but the overall z-axis dimension of the sensor does not appreciably alter, as the flattening and extending of the two respective layers effectively cancel each other out.

Figure 13:
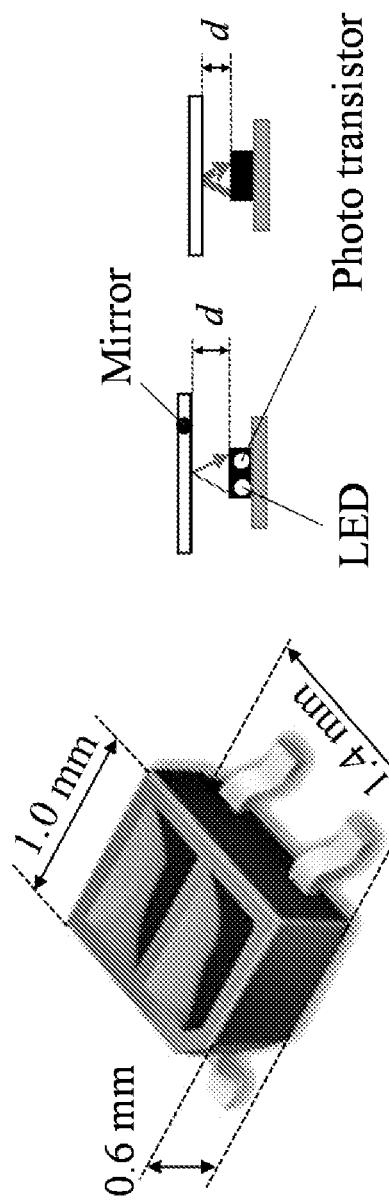
FIG. 13 is a diagram of an optical sensor.
Figure 14:
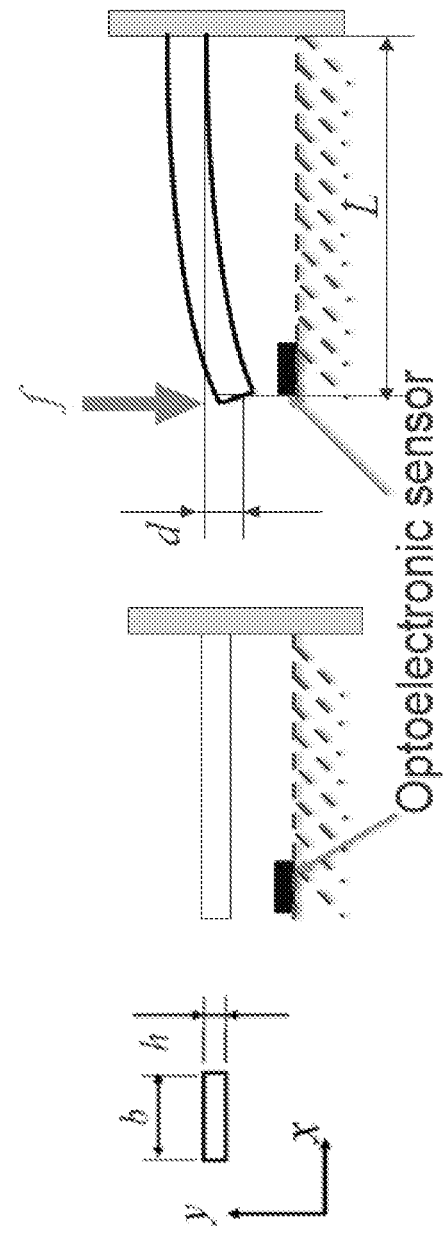
FIG. 14 is a diagram illustrating the operation of the optical sensor.
Figure 15:
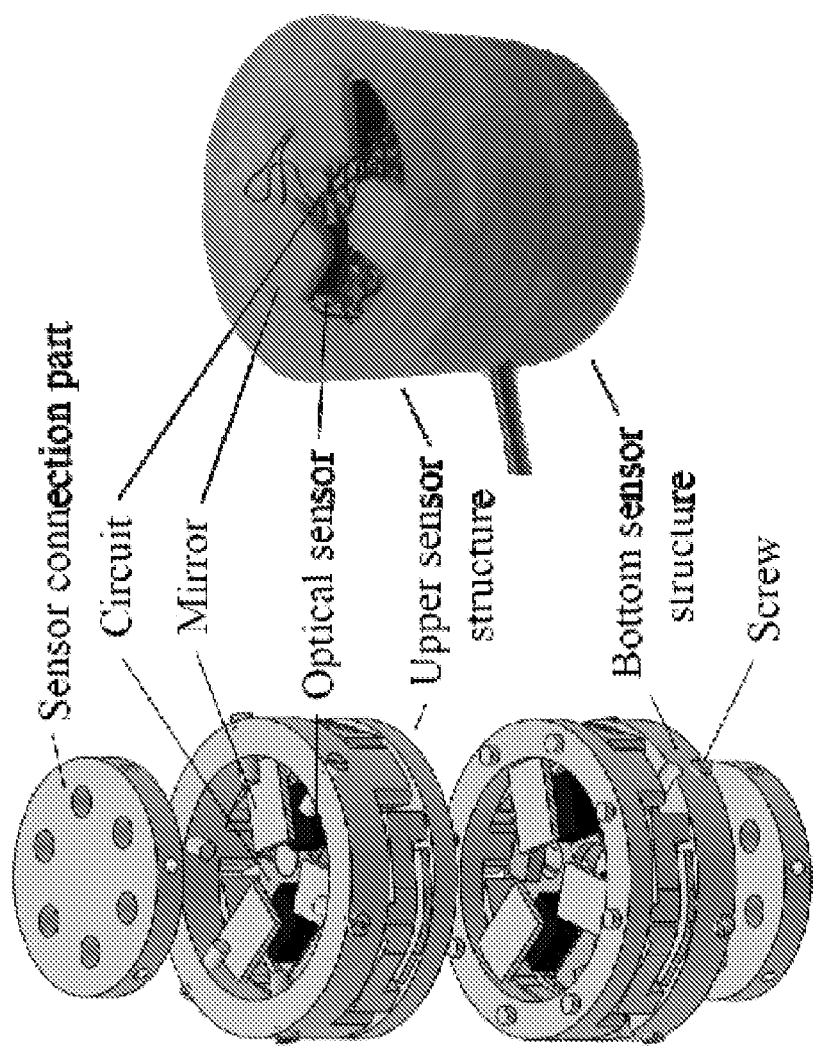
FIG. 15 is an exploded perspective view with accompanying photograph of a force sensor according to the first embodiment.
Figure 16:
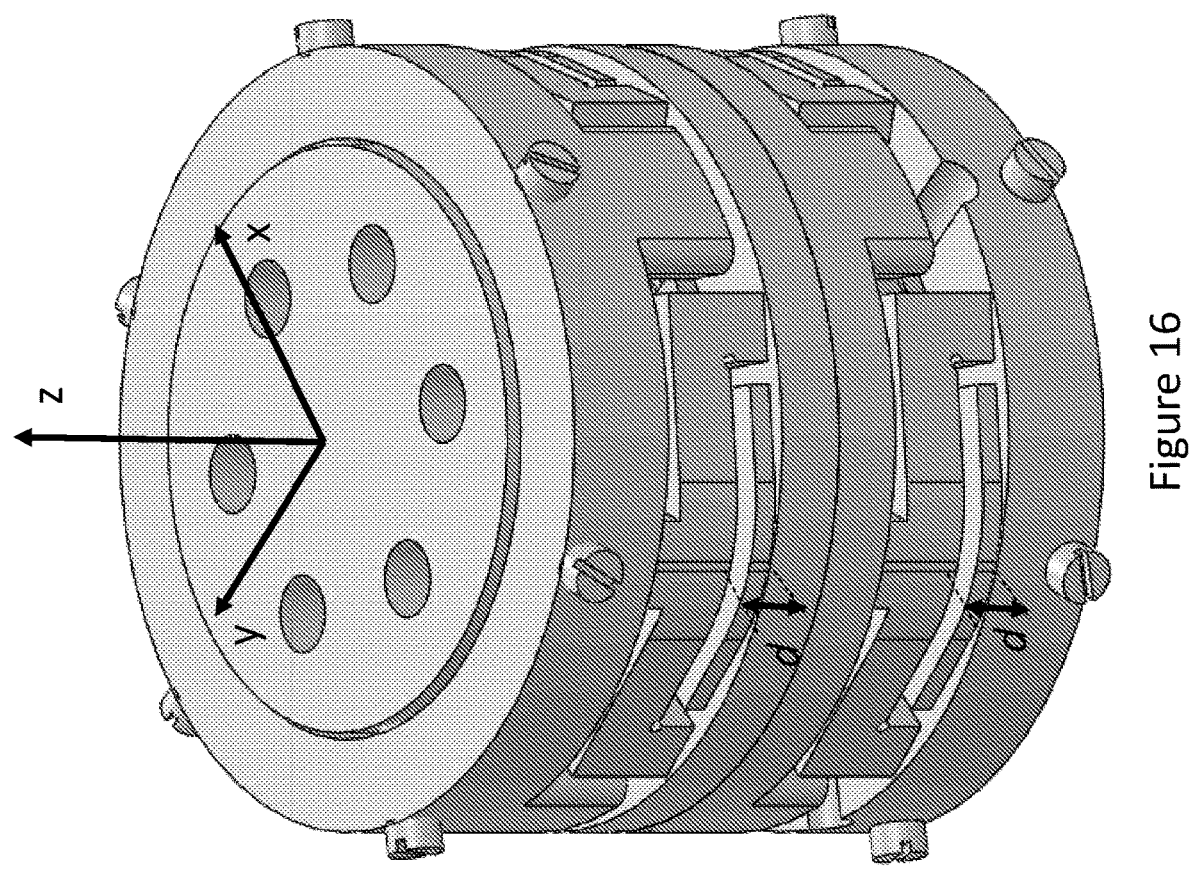
FIG. 16 is a perspective view of a force sensor according to the first embodiment which is annotated with the coordinate system of the sensor.
Figures 17, 18:
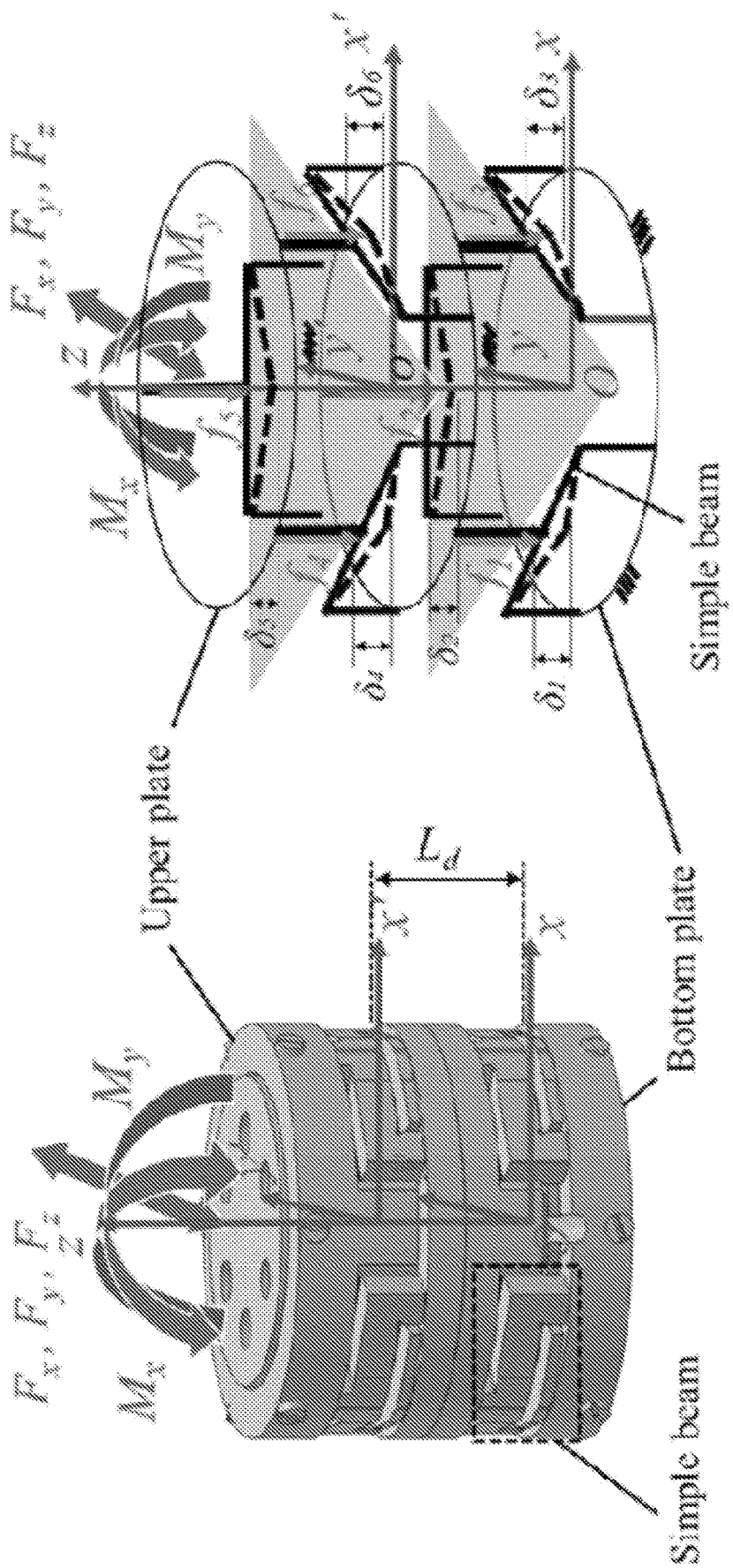
FIGS. 17 and 18 show the directions of forces and turning moments detected by the force sensor of the first embodiment.
Figure 21:
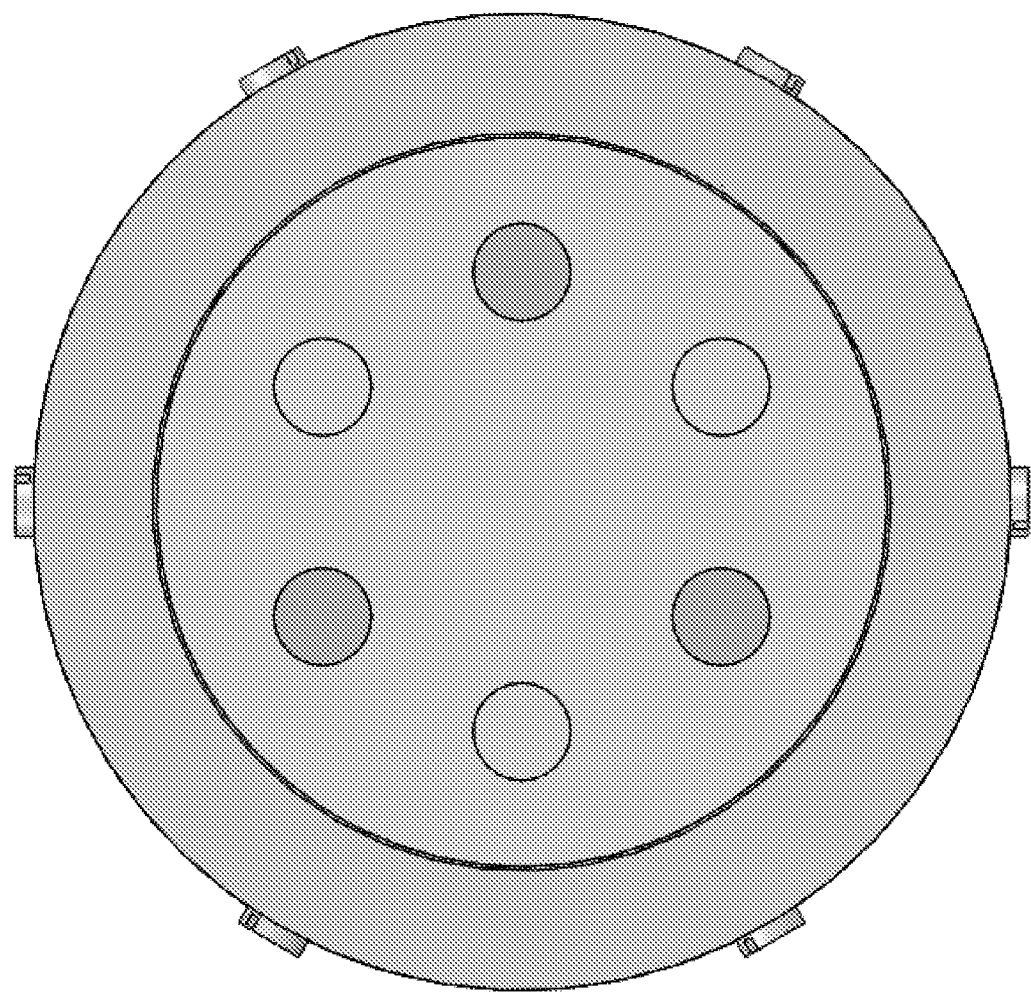
FIGS. 21 to 33 are various drawings of a second embodiment of the invention, from different views.
Figure 22:
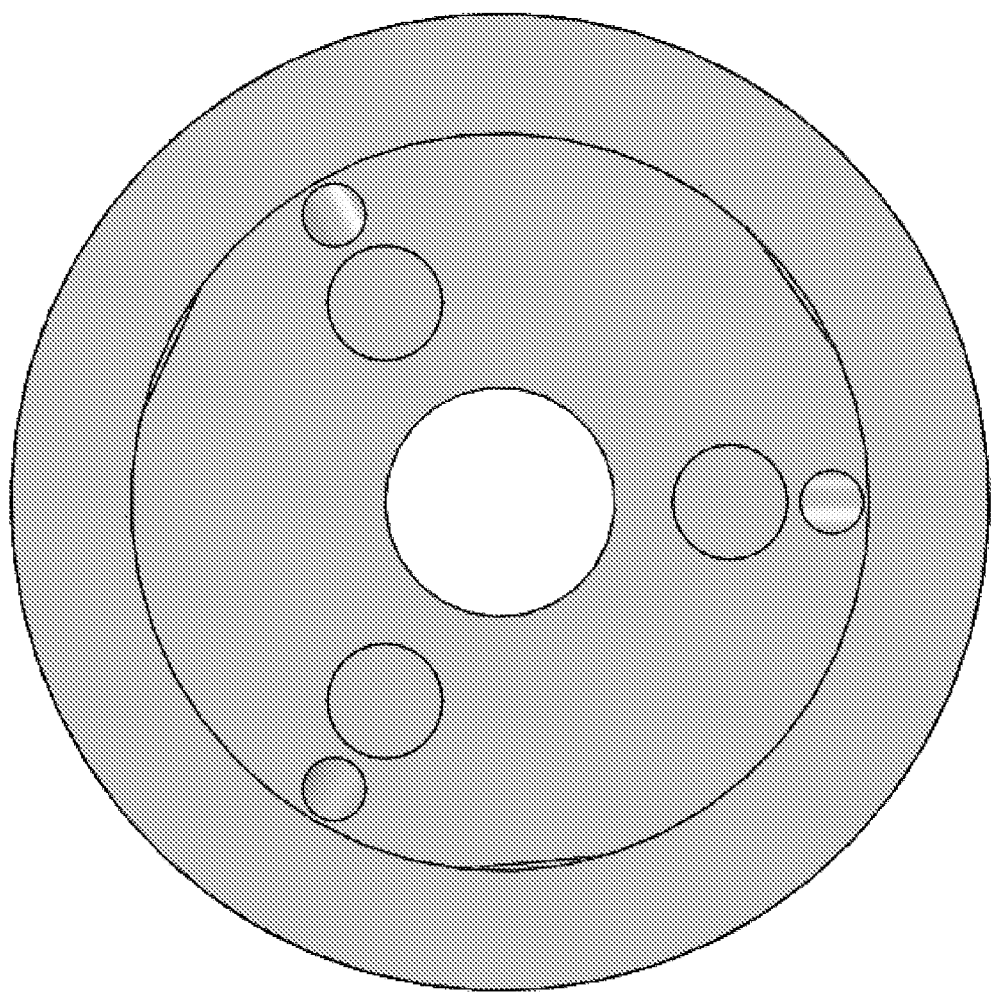
Figure 23:
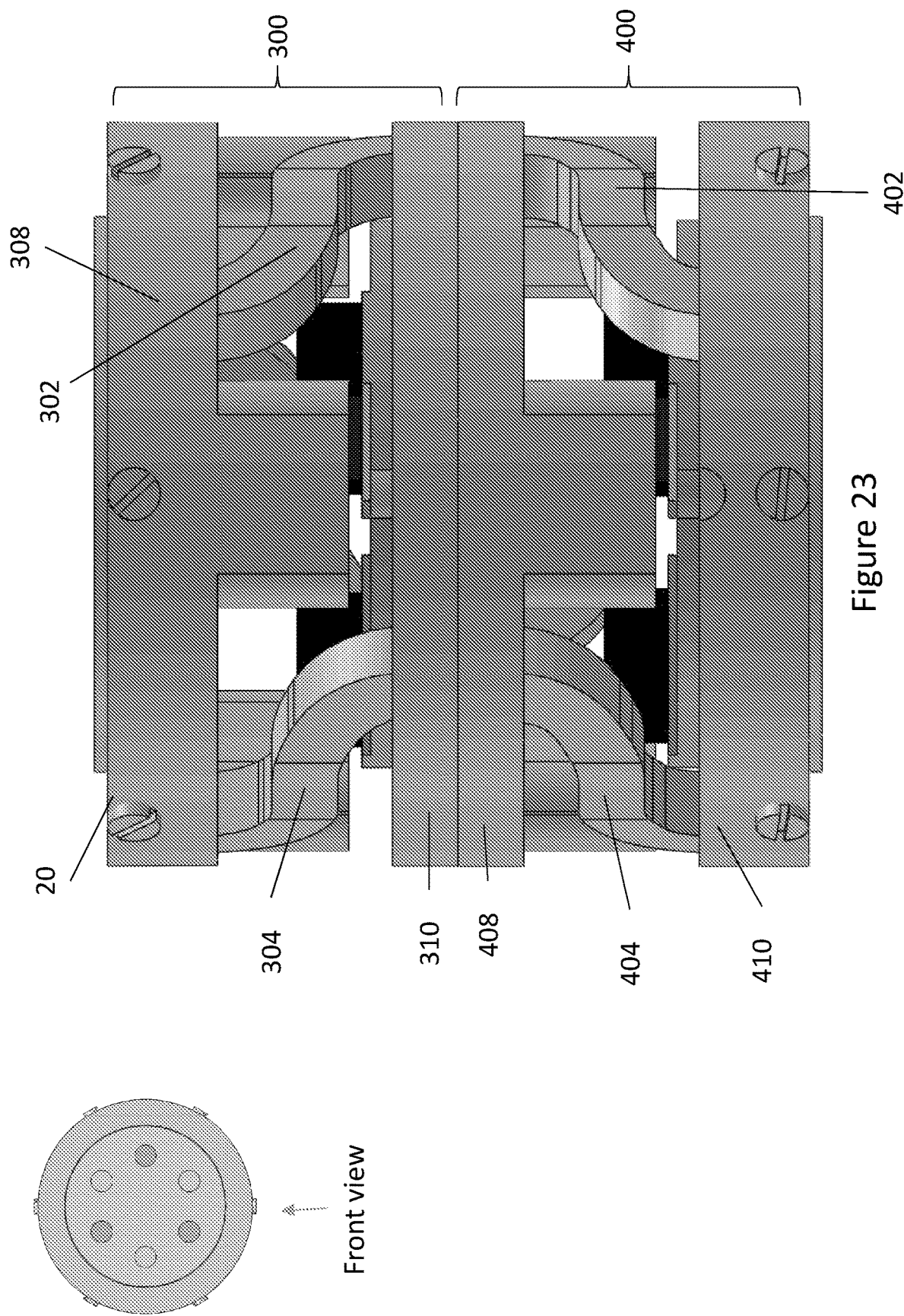
Figure 24:
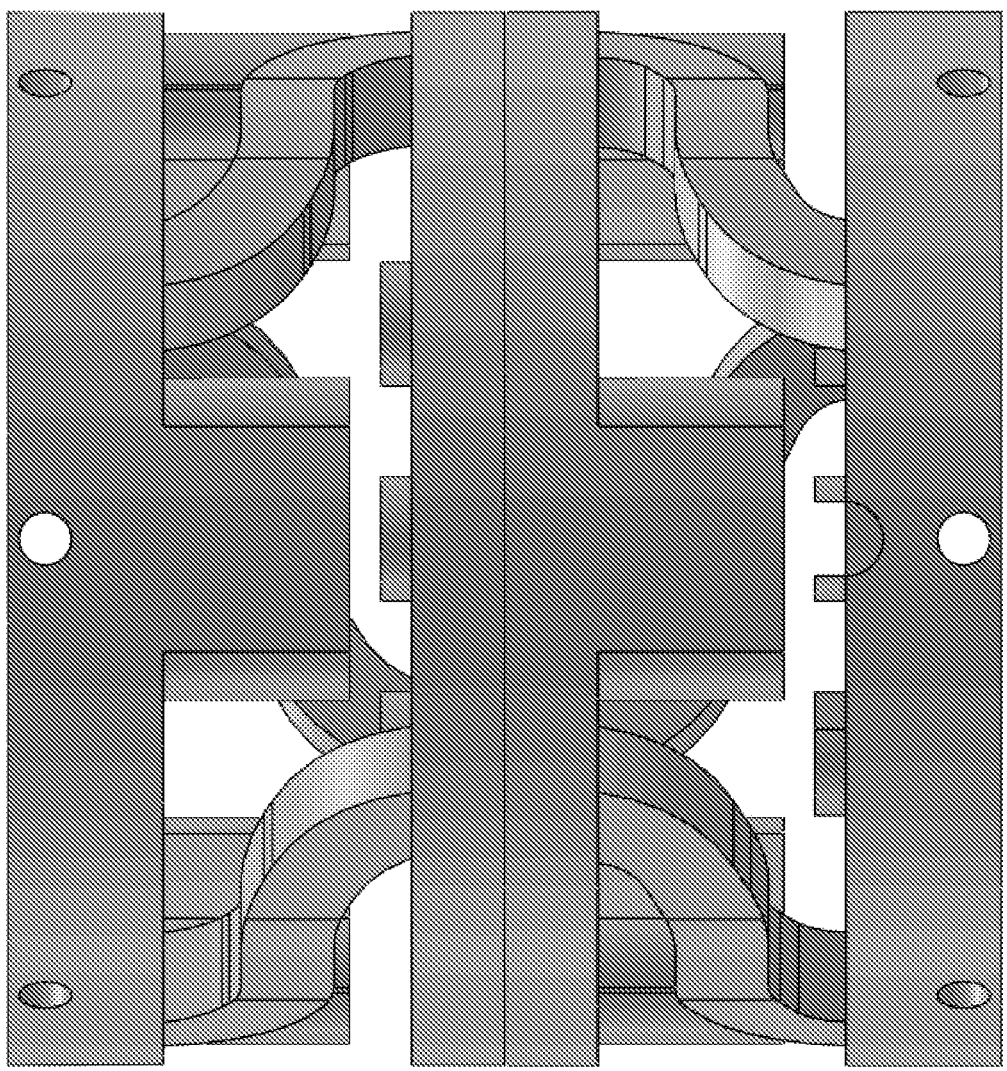
Figure 24:
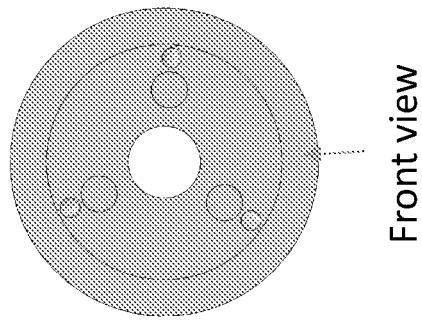
Figure 25:
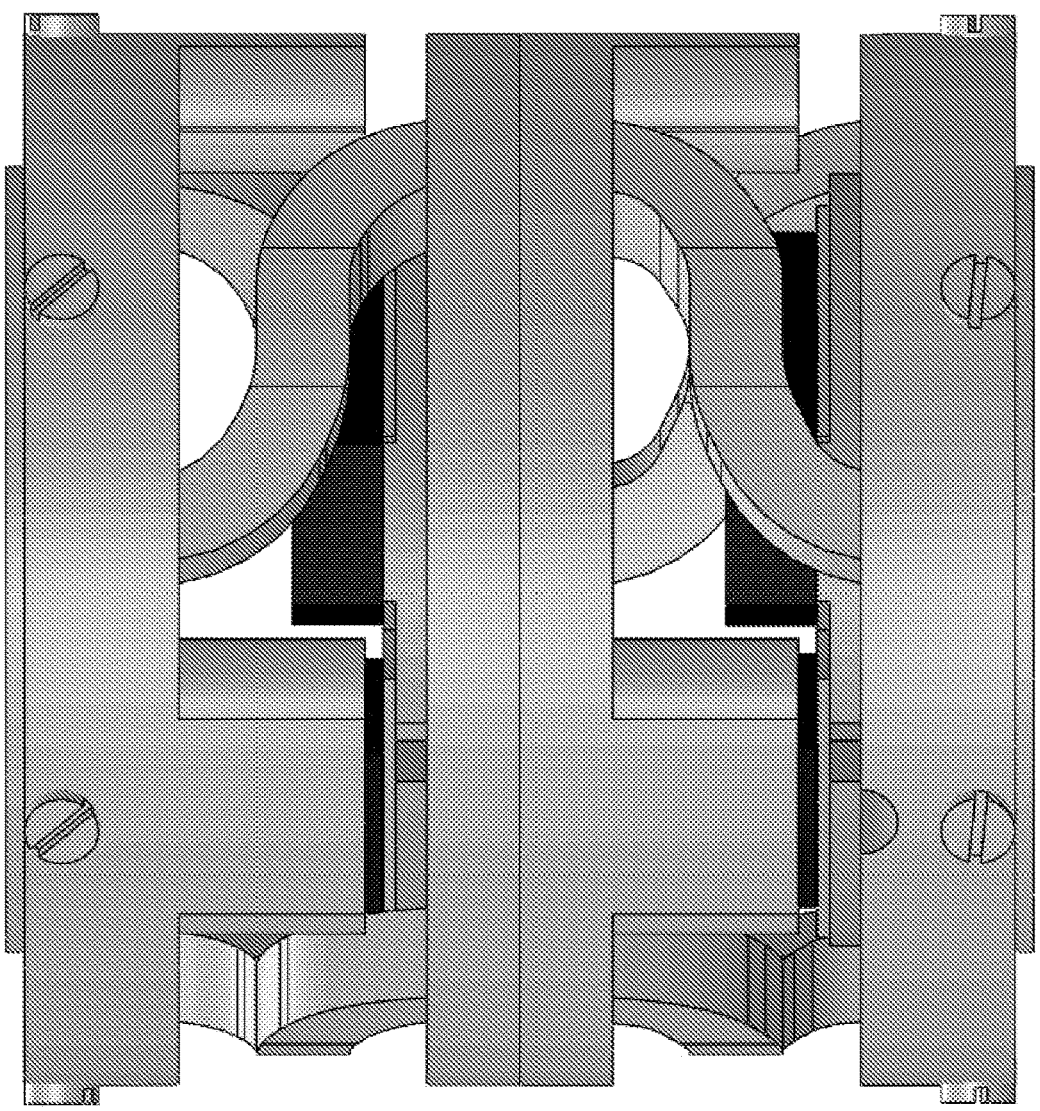
Figure 25:
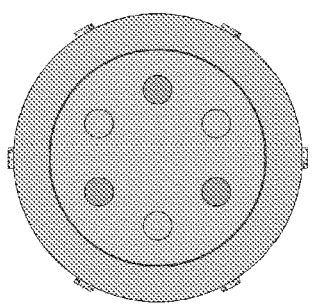
Figure 26:
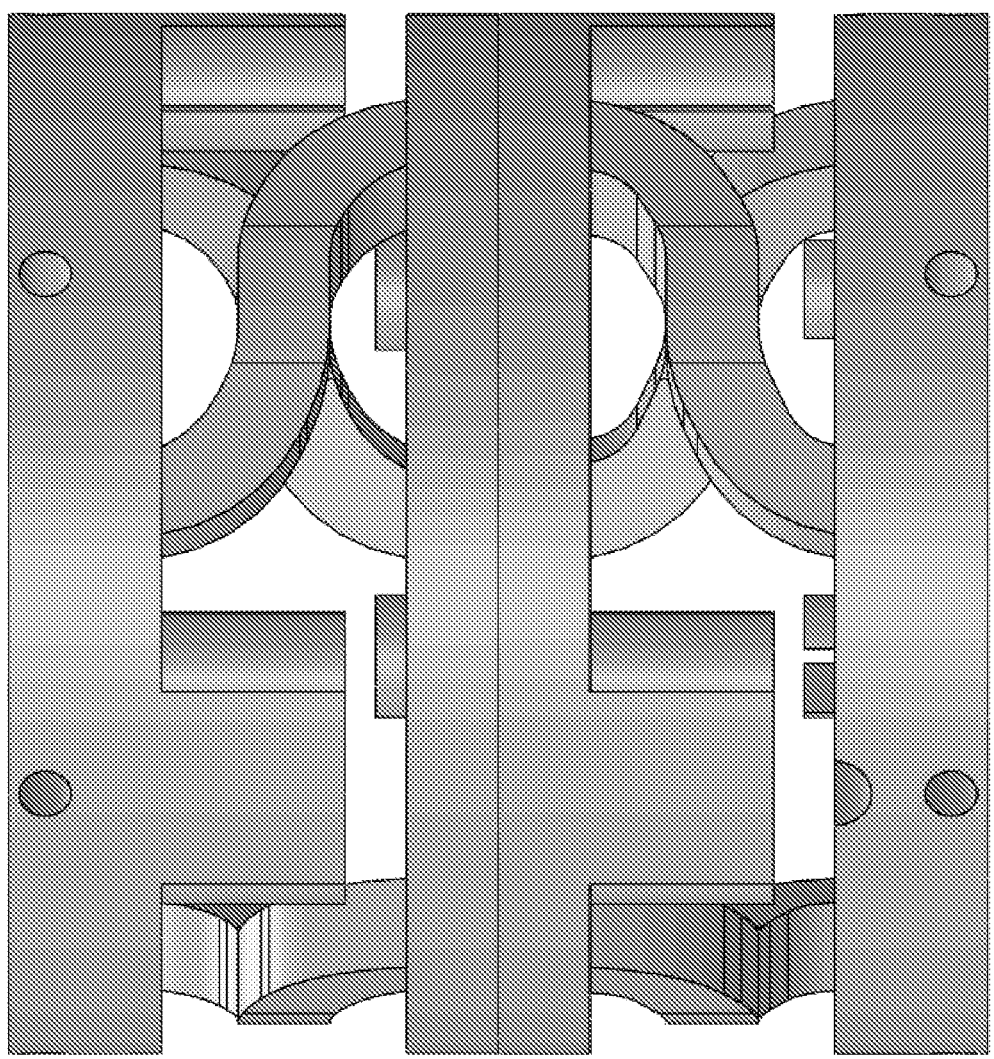
Figure 26:
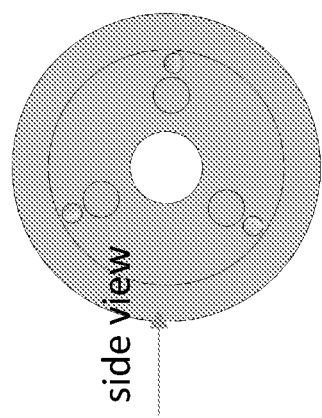
Figure 27:
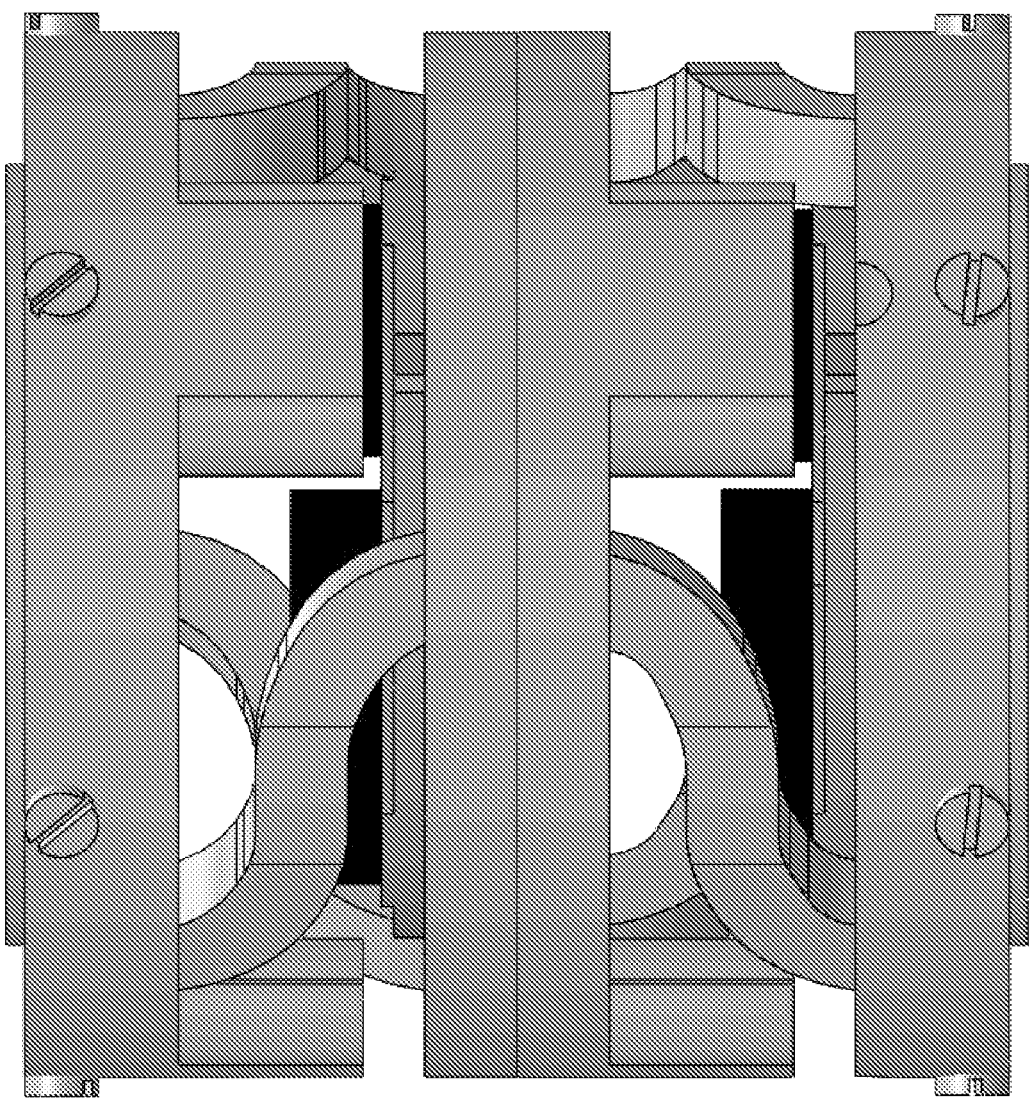
Figure 27:
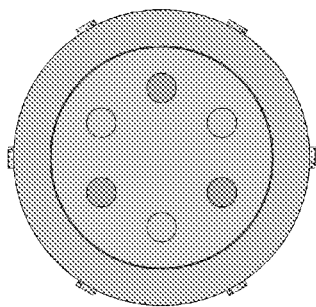
Figure 28:
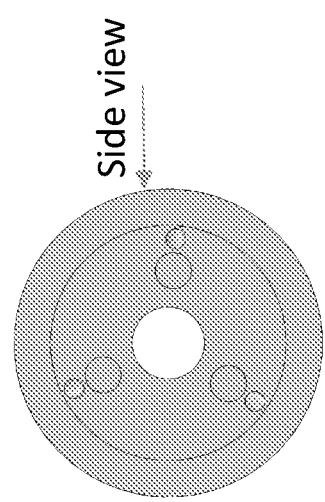
Figure 28:
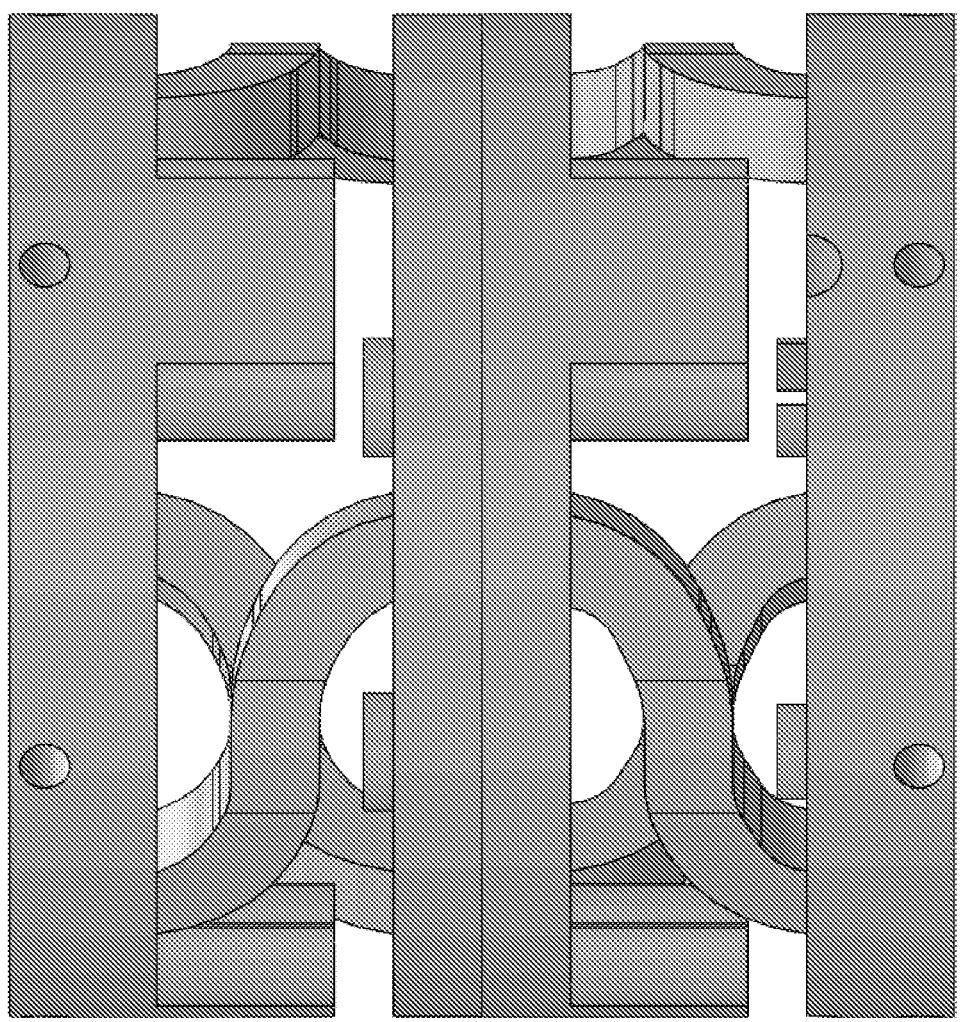
Figure 29:
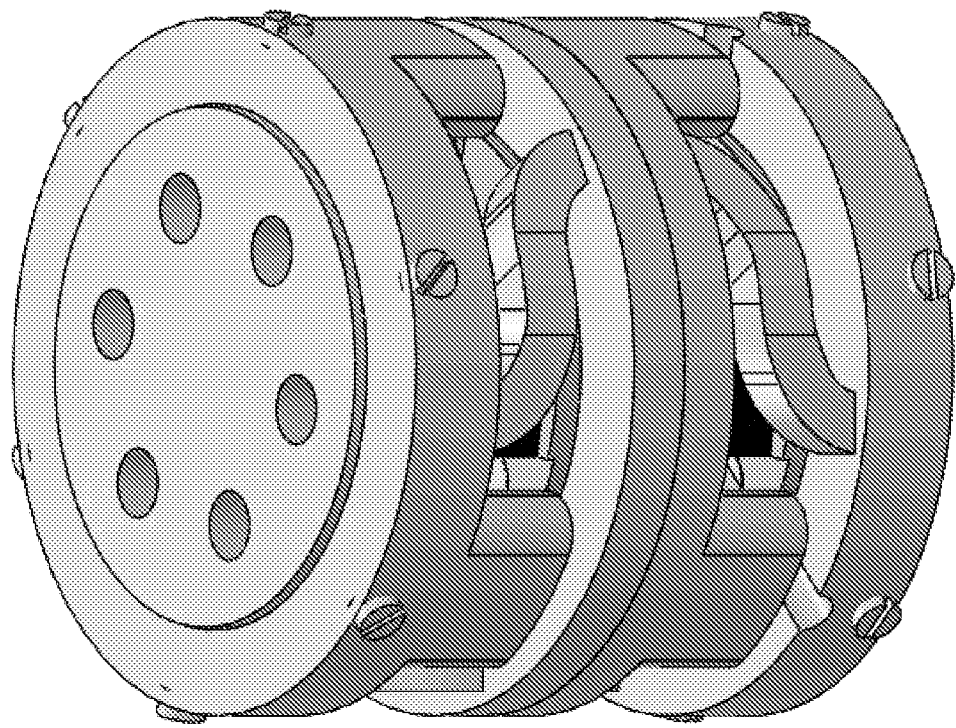
Figure 30:
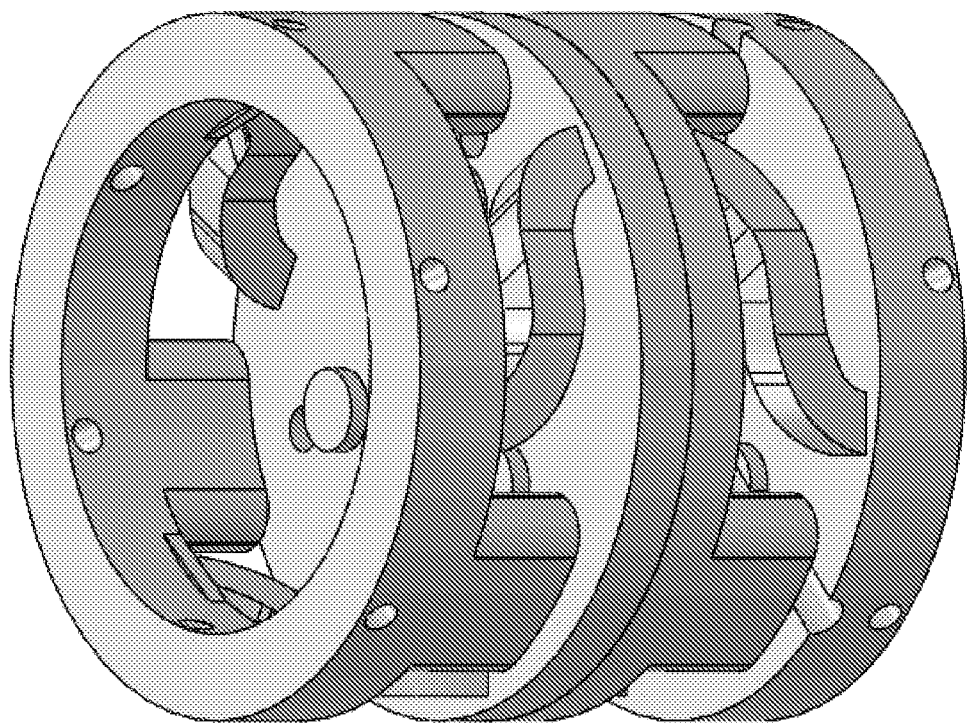
Figure 31:
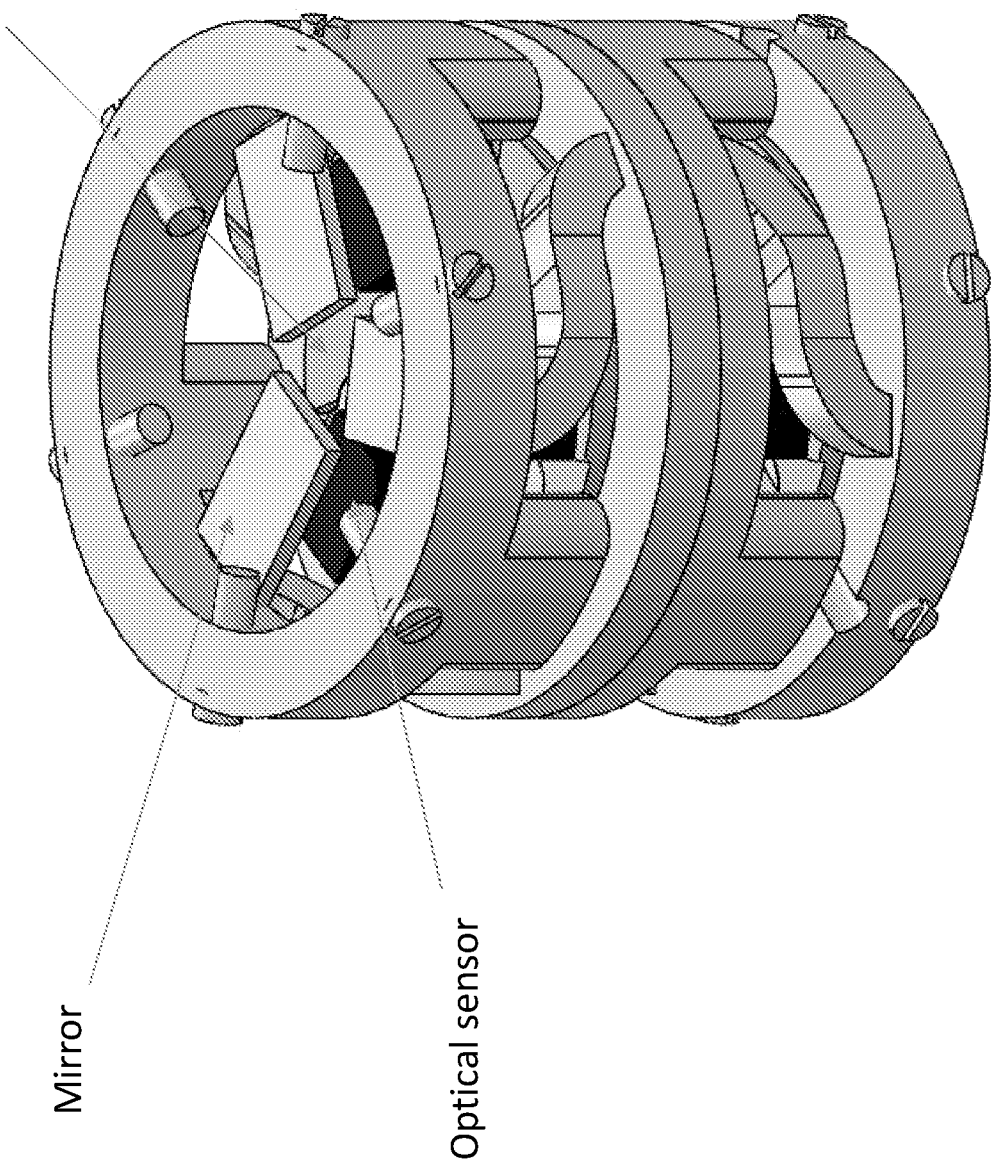
Figure 32:
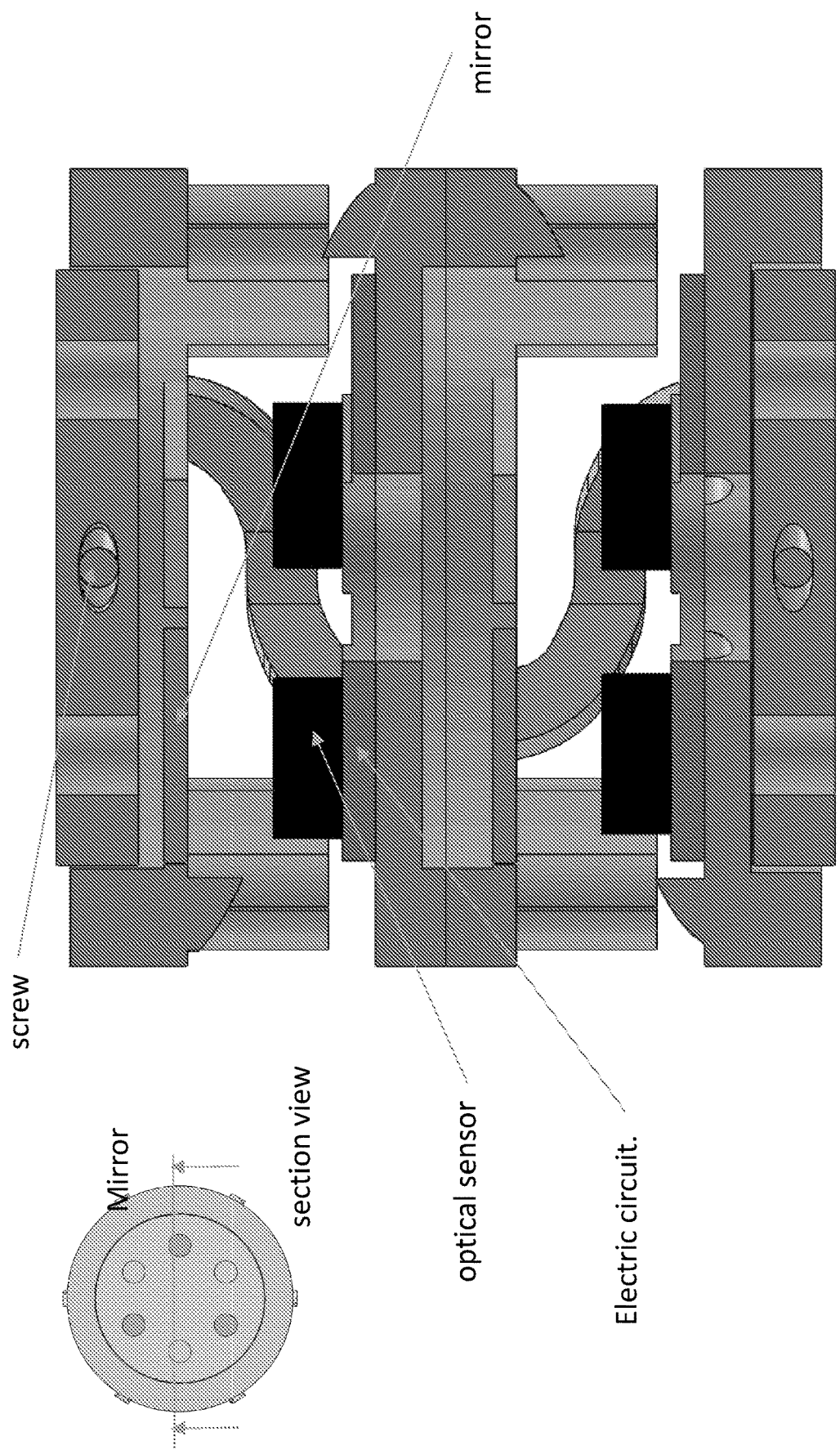
Figure 33:
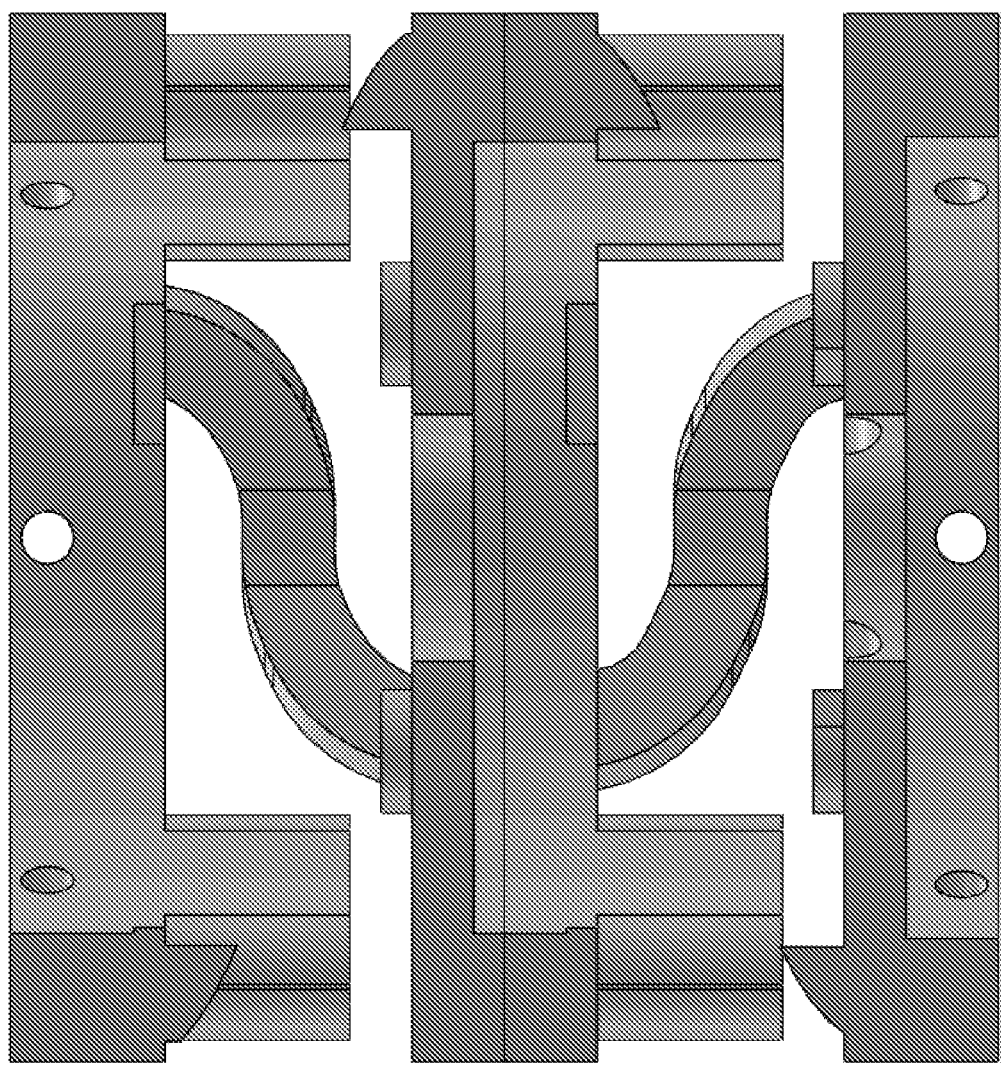
Figure 33:
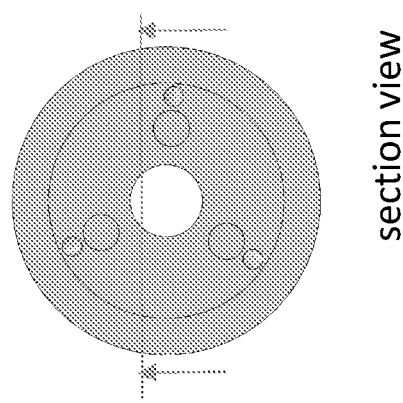

The first embodiment will now be described with respect to FIGS. 1 to 18. The overall structure of the sensor of the first embodiment is that of two three-axis force/torque sensors based on simply-supported beam structures (see FIG. 1 to FIG. 12). This results in a sensing structure that is able to measure five force/torque components in total: Fx, Fy, Fz, Mx, and My. The sensing principle is based on optical sensors measuring the displacement of deflection caused by external forces or moments (see FIGS. 13 and 14). The deformation, in turn, can be related to force/torque components. The structure of the proposed five-axis force/torque sensor is shown in FIGS. 1 to 12. A flexible ring-like structure is fabricated of polymer ABS (Acrylonitrile Butadiene Styrene) by a rapid prototyping machine (e.g. Project HD-3000 Plus, 3D Systems). As mentioned earlier, two three-DoF sensing structures are attached on top of each other. Each element has three flexures (simply supported beams) as shown in FIG. 5, amongst others. Consequently, the overall sensor structure has six deflections ($\delta 1, \delta 2, \delta 3, \delta 4, \delta 5,$ and $\delta 6$) which can be measured and are the input to a calibration matrix to estimate Fx, Fy, Fz, Mx, and My. In this first embodiment it is not possible to measure Mz since the sensor structure constrains deformation with respect to rotational torque along the z-axis.

The physical structure of the force sensor according to the first embodiment is shown in FIGS. 1 to 17. From these figures it will be seen that the sensor comprises a circular upper element 100 and a circular lower element 200, both of which are identical to each other. Each element in turn comprises an upper ring 108, 208, and a lower ring 110, 210, with the lower ring 110 of the upper element 100 being mounted on the upper ring 208 of the lower element, such that the elements 100 and 200 can be considered stacked on top of each other. The upper and lower rings lie with their circumferences in the X-Y plane of the sensor, with the Z-axis running along the axis of rings orthogonal to the X-Y plane.

Within each element 100 and 200 are formed three respective beam structures that extend circumferentially around the rings, and connect the respective upper rings and the lower rings of each element. Each beam structure comprises two elongated Z-shaped beams, with the long axis 102, 104, 202, 204 of each beam being suspended parallel to and between the upper and lower rings 108, 110, 208, 210, and connected at opposite ends to one or other of the upper and lower rings, such that one end of the elongated beams is connected by a short portion extending in an orthogonal direction to the direction of the beam to connect the beam to the lower ring, whilst the other end of a beam is connected by a second short portion extending in an opposite orthogonal direction to connect the other end of the beam to the upper ring. This arrangement is repeated in symmetrical pairs (e.g. 102 and 104, 202 and 204) around the circumference of the element, such that three symmetrical pairs of beam structures are provided in each of the upper and lower elements, suspended between the respective upper and lower rings of each element 100 and 200. For example, the upper element 100 has symmetrical pairs of beam structures 102 and 104, 114 and 106, and 120 and 122. Likewise the lower element 200 has pairs of beam structures 202 and 204, 214 and 206, and 220 and 222. Like the upper and lower rings, the beam structures lie within the X-Y plane of the sensor, in the first embodiment.

Also provided extending from the upper ring of each element is a downward projection portion 112, 212, 116, 216, 124, 214, that extends downward along the Z-axis of the sensor from the circumference of the or each upper ring towards the respective lower ring of each element. A downward projection portion is provided separating each symmetrical pair of beam structures from the next pair around the circumference, and hence three such projections are provided between the three symmetrical pairs of beam structures.

Figure 11:
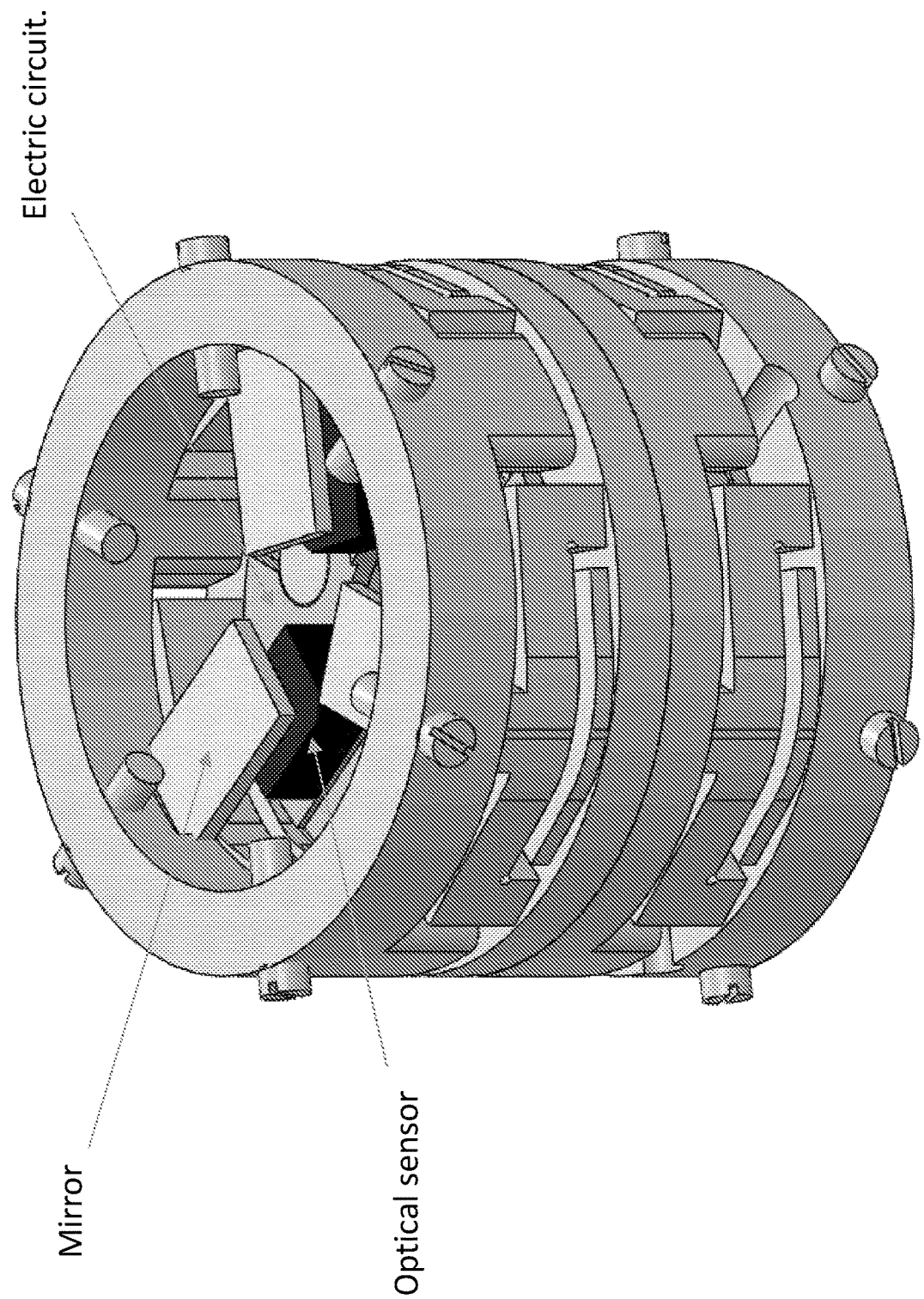
Figure 12:
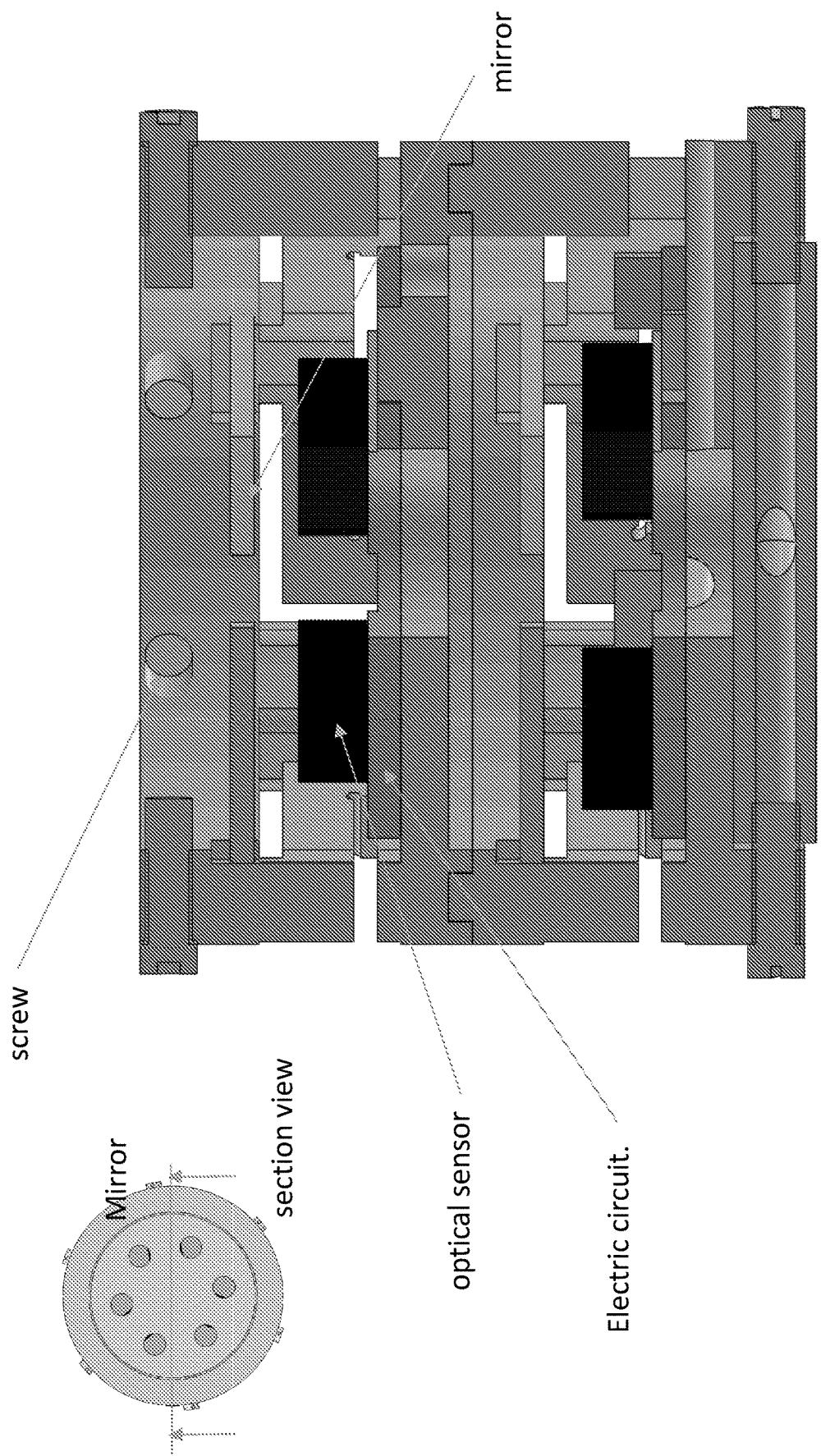

The sensor 10 operates using optical techniques to detect deflection of the sensor under a load force, and six optical sensors are included in the sensor, with three in each of the upper and lower elements 100 and 200. FIGS. 11 and 12 illustrate the configuration of the optical sensors, from which it can be seen that three optical sensors are provided within each element equiangularly spaced around the elements at 120 degree intervals. Each sensor comprises a mirror 1102, an optical sensor 1104, and a corresponding electric drive circuit 1106. The optical sensors act to measure precisely the distance between the sensor output and the respective mirror, and to detect changes in the distance caused by movement or deflection of the sensor body in any direction.

In more detail, we are able to miniaturise the diameter of the five-DoF sensor of the first embodiment to 17 mm. The height of the described embodiment is about 14 mm. Inside the mechanical structure six optical sensors (1104) are mounted to the top and bottom using two flexible circuits (by Sunhayato Corp., Japan) as shown in FIG. 11. Each sensor is opposed by a mirror (1102). Here, we assembled QRE1113 reflectance sensors from Fairchild Semiconductor Corp. comprised of two parts—an IR emitting LED and an IR sensitive phototransistor (see FIGS. 13 and 14). The LED is the light source; the reflected light is transmitted to the phototransistor via the mirror. The phototransistor converts the reflected light intensity into a voltage. The closer the distance between the mirror and the optical sensor is, the larger an amount of the reflected light intensity, and in proportion to the reflected light intensity, the output voltage of the phototransistor increases. When external forces or moments are applied on the upper plate of the sensor, the six deflections ($\delta 1$, $\delta 2$, $\delta 3$, $\delta 4$, $\delta 5$, and $\delta 6$) are measured by the six optical sensors (see FIG. 12). Processing the amount of the six deflections, force/torque components can be calculated. In general, the optical sensor is sensitive to external light, so the housing covering the sensing structure is painted in black colour and, hence, blocks external light.

Figure 34:
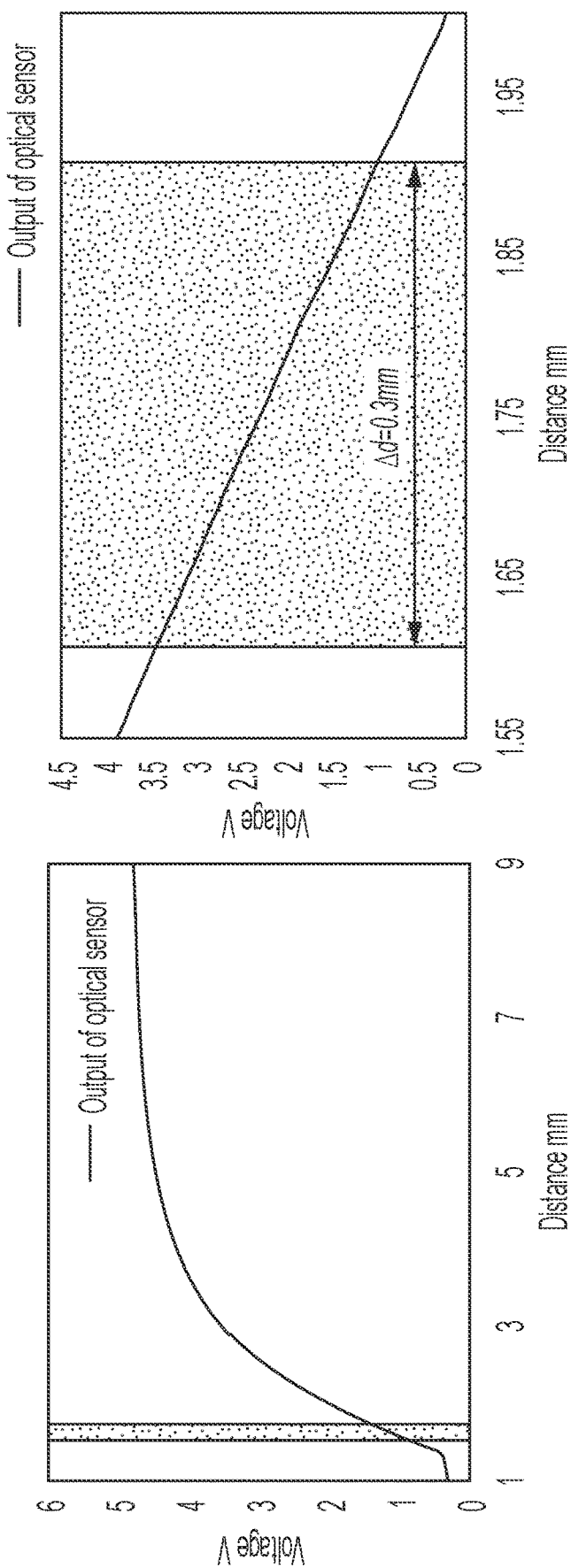
FIG. 34 is a pair of graphs illustrating the output of the optical sensors used in embodiments of the invention.

FIG. 34 (a) shows the voltage output of the optical sensor with respect to a distance variation between the sensor and opposed mirror. As the voltage output change within 0.3 mm (which is the maximum deflection of each simply-supported beam) is minimal, an amplifier has been designed to obtain larger voltage changes (see FIG. 34 (b) blue area). All wires for measuring the voltage output of the six optical sensors and for the power supply of the amplifier are guided within a 1.2 mm spring wire (shield cable).

With respect to how an input force can be measured using the above arrangement, the sensor structure is comprised of six simply-supported beams and, from their deflections ($\delta 1$, $\delta 2$, $\delta 3$ $\delta 4$, $\delta 5$, and $\delta 6$), the force components (f1, f2, f3, f4, f5, and f6) can be calculated by multiplying the six deflections by spring coefficients k as shown in Equations. 1 to 6. From these six force components, Fz, M1x, M2x, M1y, M2y, Mx, and My can be calculated using Equations 7 to 12.

$$f_1 = k_1 \delta_1 \quad (1)$$

$$f_2 = k_2 \delta_2 \quad (2)$$

$$f_3 = k_3 \delta_3 \quad (3)$$

$$f_4 = k_4 \delta_4 \quad (4)$$

$$f_5 = k_5 \delta_5 \quad (5)$$

$$f_6 = k_6 \delta_6 \quad (6)$$

$$F_z = (f_1 + f_2 + f_3 + f_4 + f_5 + f_6)/2 \quad (7)$$

$$M_x = M_{2x} - M_{1x}, M_y = M_{2y} - M_{1y} \quad (8)$$

$$M_{1x} = -L_{2y} \cdot f_5 + L_{1y} \cdot f_6 + L_{3y} \cdot f_4 \quad (9)$$

$$M_{1y} = L_{1x} \cdot f_6 - L_{3x} \cdot f_4 \quad (10)$$

$$M_{2x} = -L_{2y} \cdot f_2 + L_{1y} \cdot f_3 + L_{3y} \cdot f_1 \quad (11)$$

$$M_{2y} = L_{1x} \cdot f_3 - L_{3x} \cdot f_1 \quad (12)$$

$$M_x = L_{3y} \cdot f_1 - L_{2y} \cdot f_2 + L_{1y} \cdot f_3 - L_{3y} \cdot f_4 + L_{2y} \cdot f_5 - L_{1y} \cdot f_6 \quad (13)$$

$$M_y = -L_{3x} \cdot f_1 + L_{1x} \cdot f_3 + L_{3x} \cdot f_4 - L_{1x} \cdot f_6 \quad (14)$$

The force components Fx and Fy are calculated by the difference of the two moment components divided by Ld using Equations 15 and 16

$$F_x = \frac{M_{2y} - M_{1y}}{L_d} \quad (15)$$
$$= \frac{-L_{3x} \cdot f_1 + L_{1x} \cdot f_3 + L_{3x} \cdot f_4 - L_{1x} \cdot f_6}{L_d}$$

$$F_y = \frac{M_{2x} - M_{1x}}{L_d} \quad (16)$$
$$= \frac{L_{3y} \cdot f_1 - L_{2y} \cdot f_2 + L_{1y} \cdot f_3 - L_{3y} \cdot f_4 + L_{2y} \cdot f_5 - L_{1y} \cdot f_6}{L_d}$$

Figure 1:
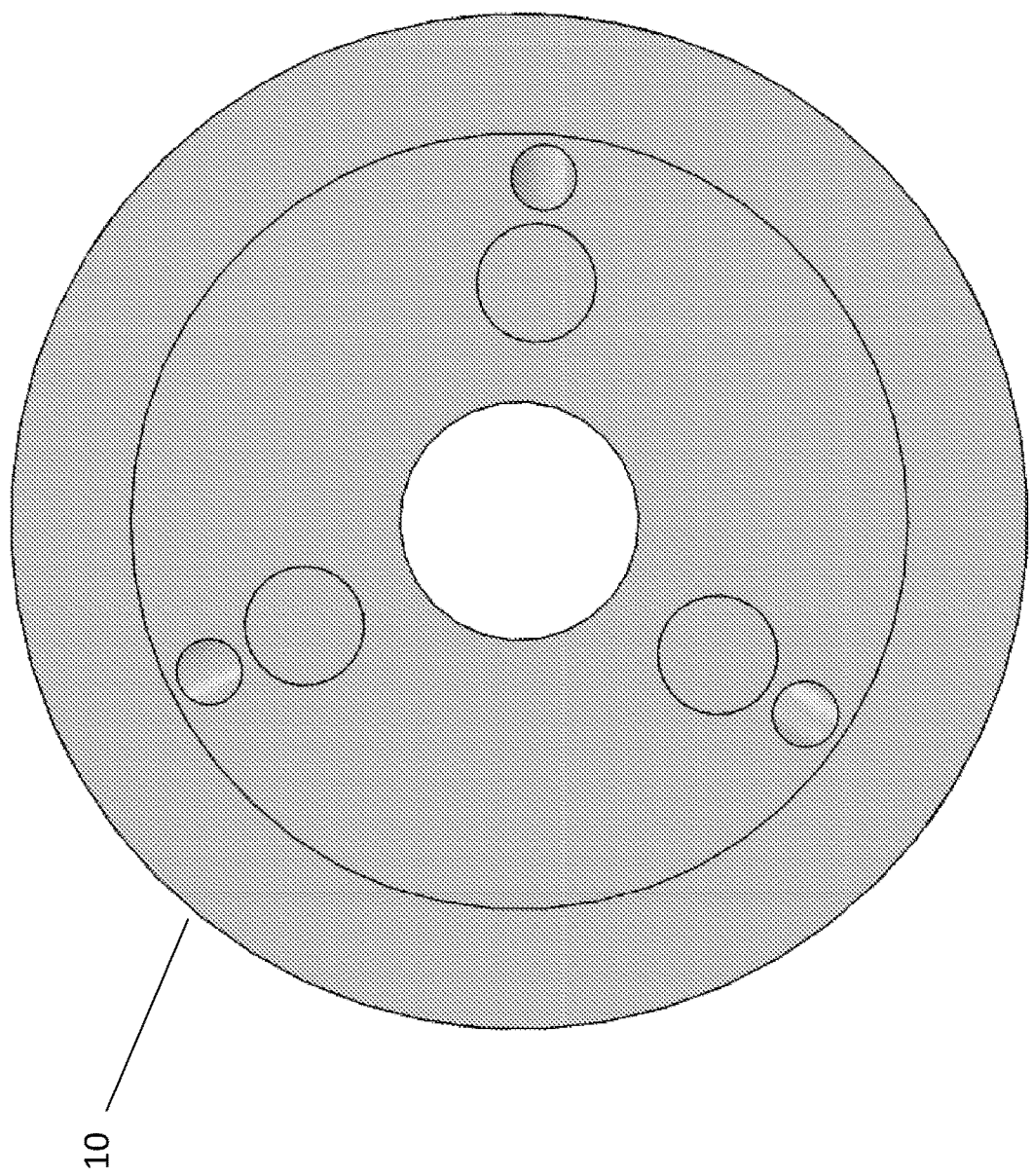
FIGS. 1 to 12 are various drawings of a first embodiment of the invention, from different views.
Figure 2:
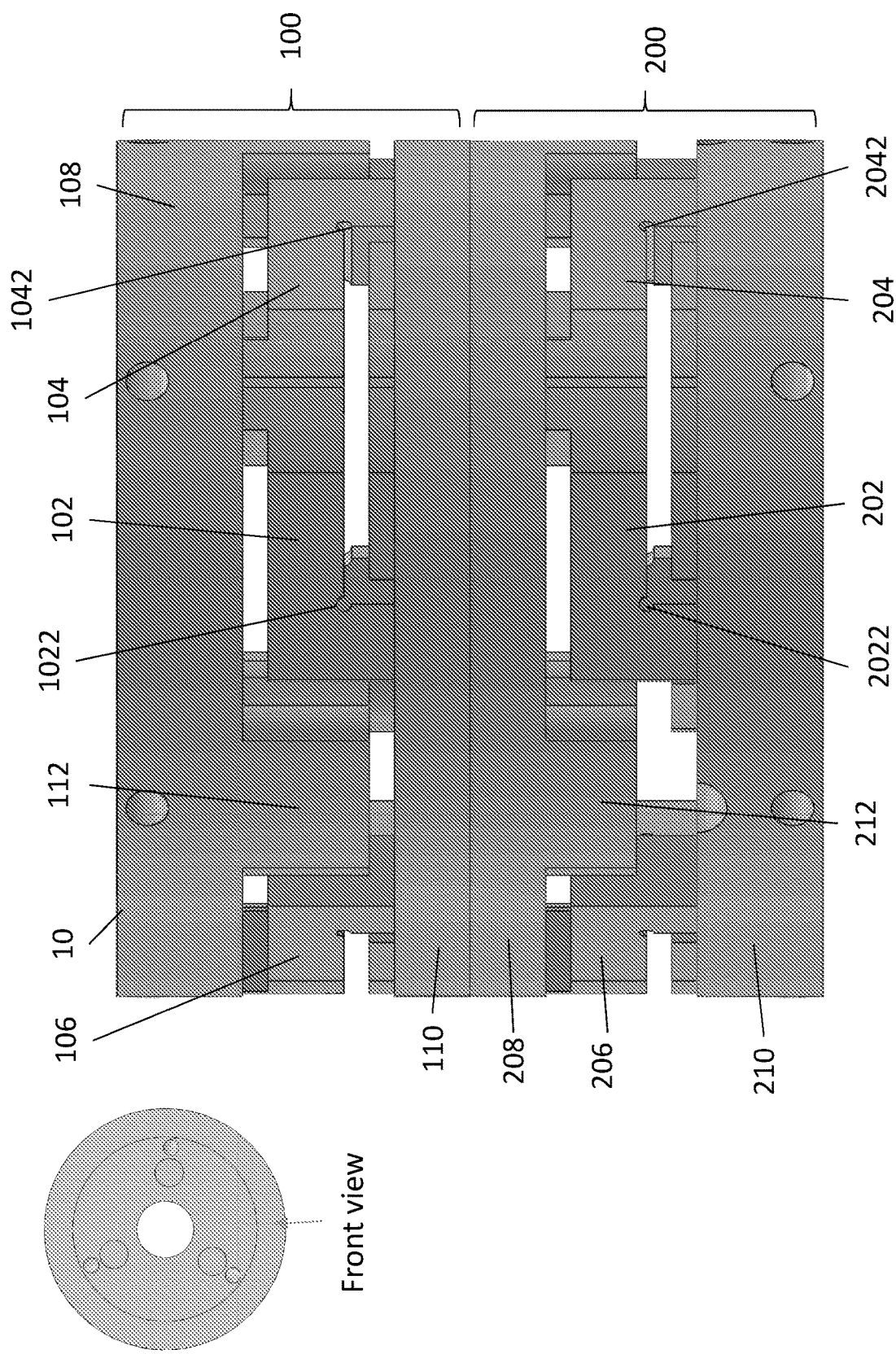
Figure 3:
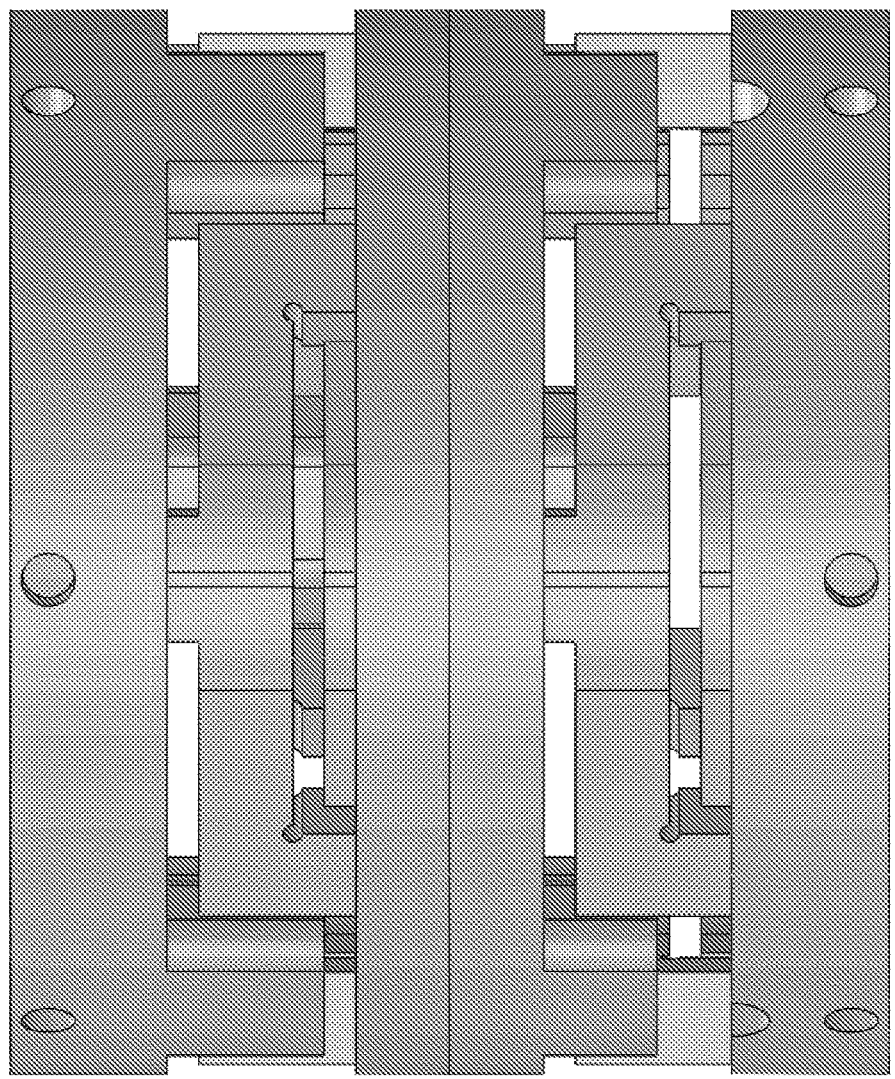
Figure 3:
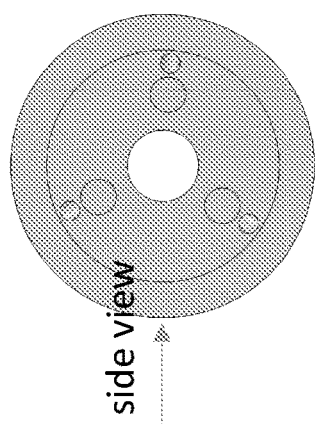
Figure 4:
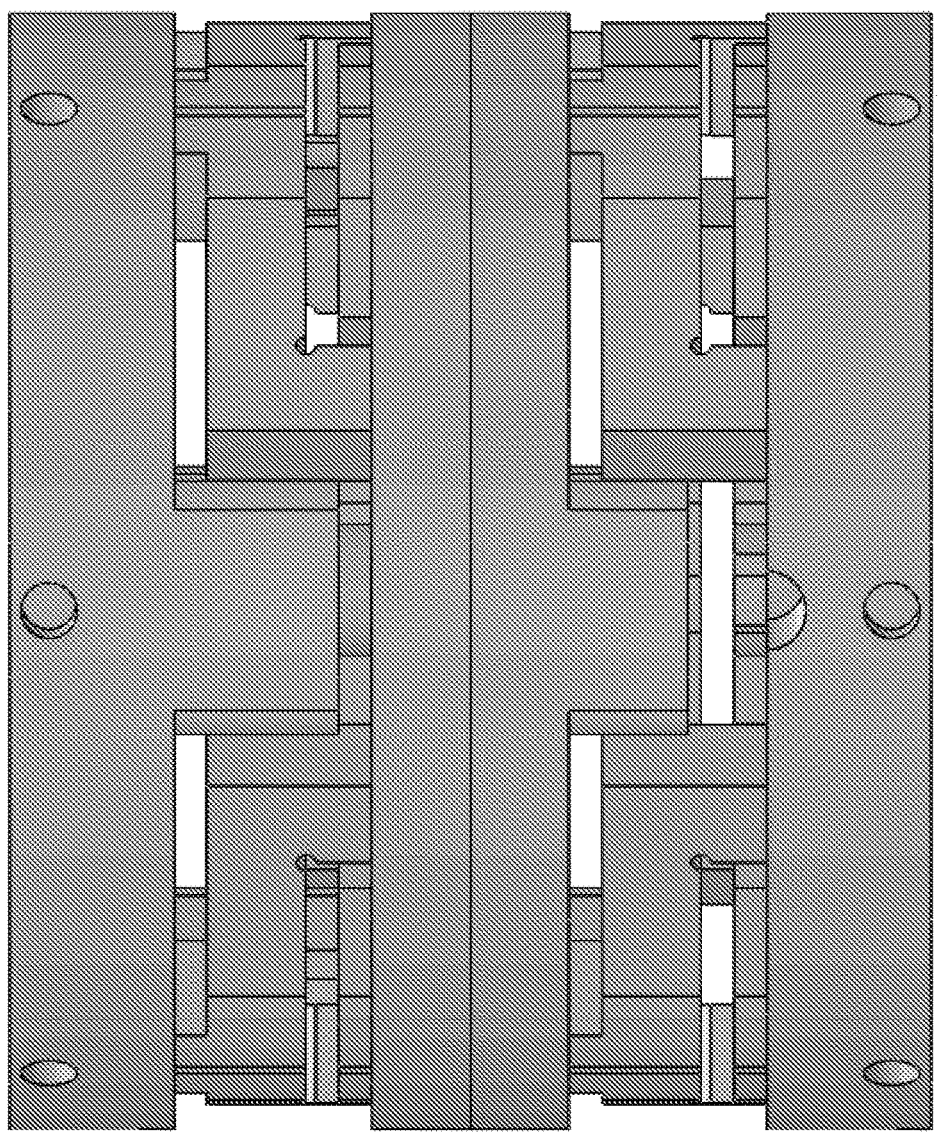
Figure 4:
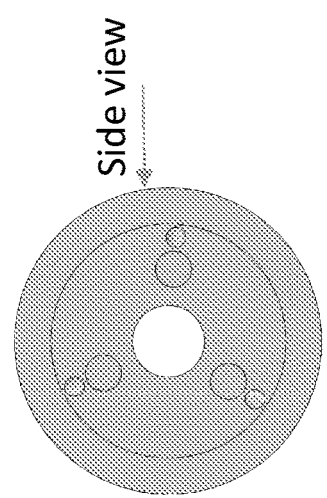
Figure 5:
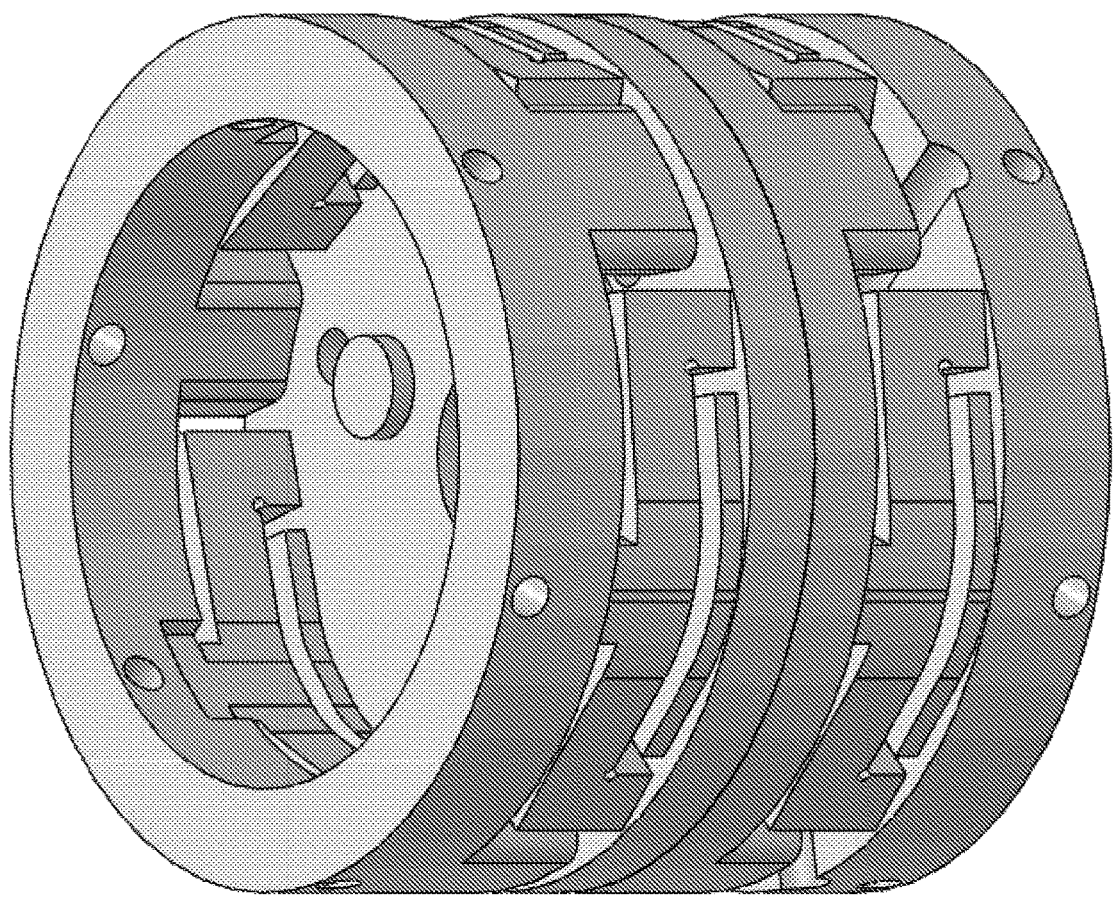
Figure 6:
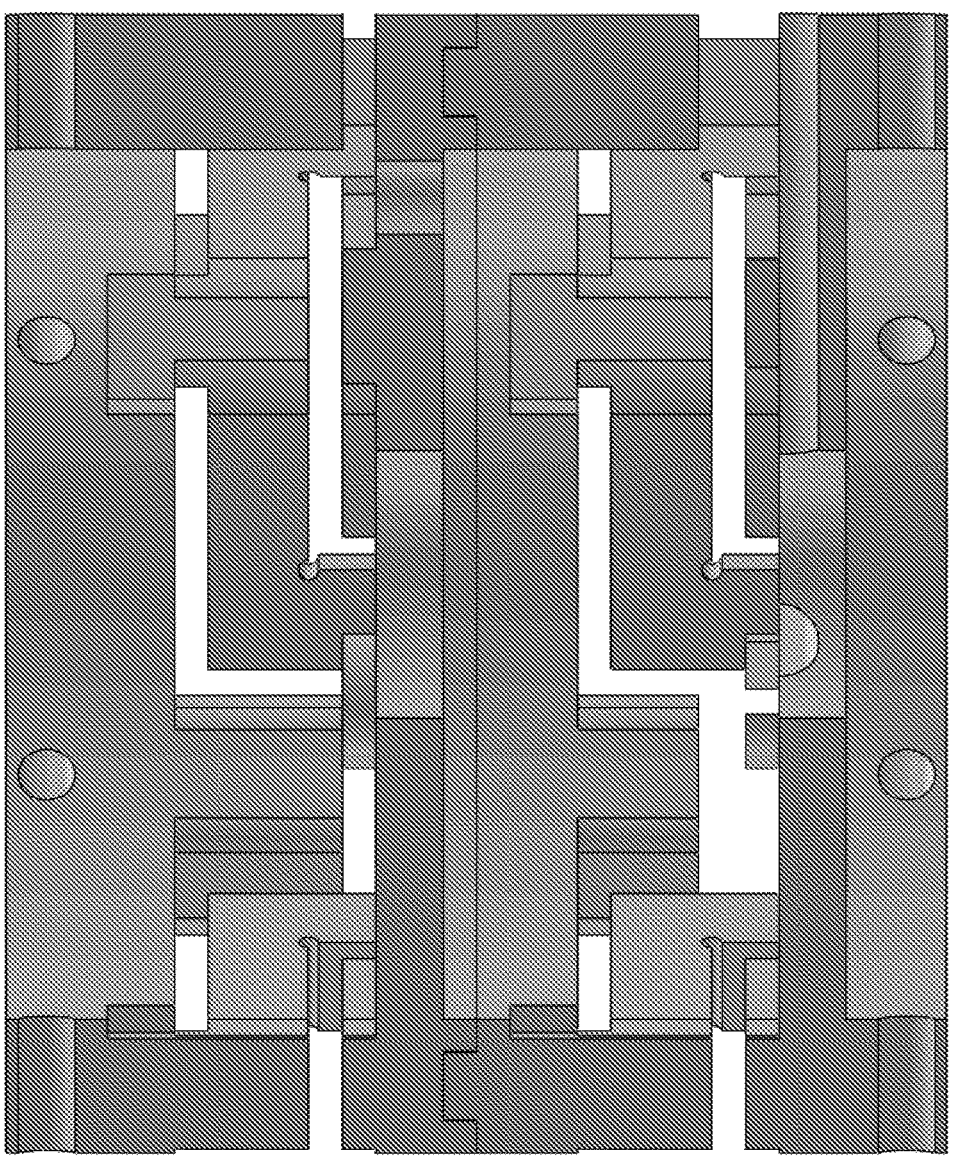
Figure 6:
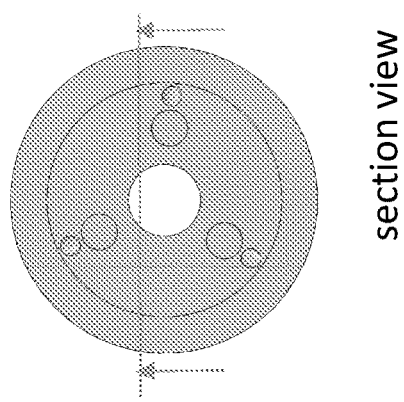
Figure 7:
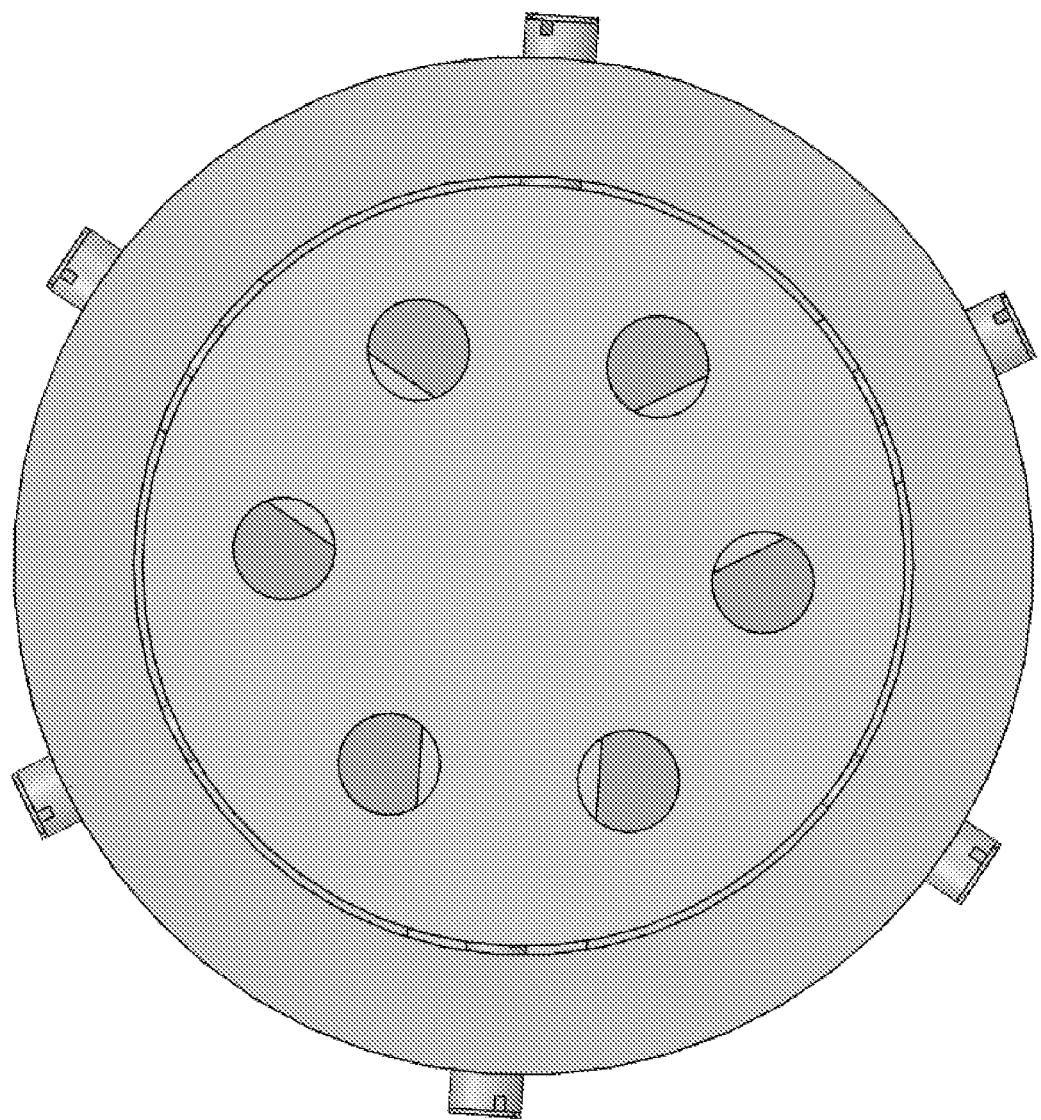
Figure 8:
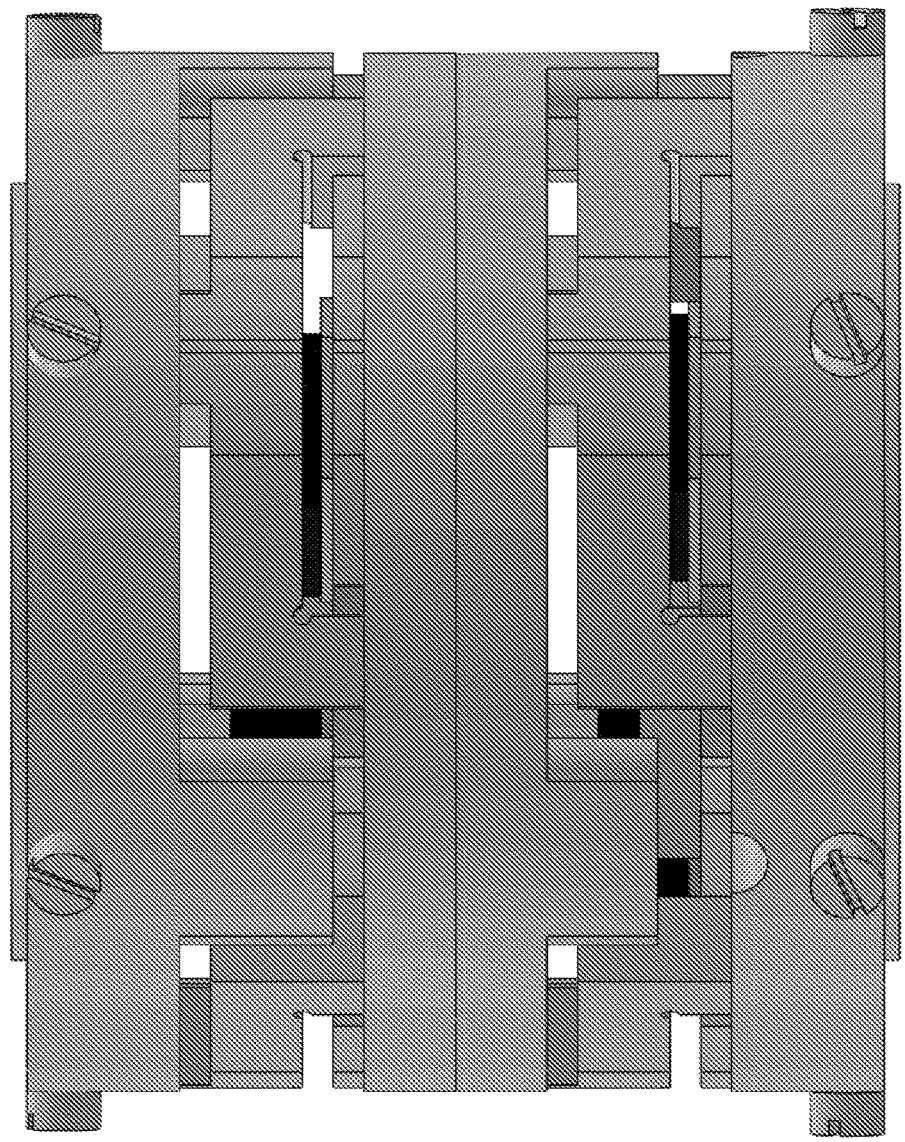
Figure 8:
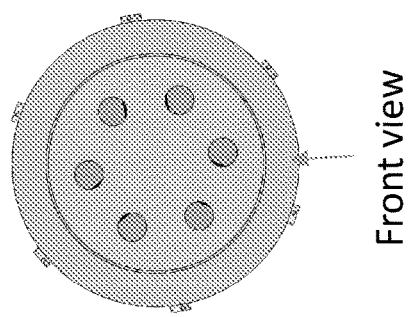
Figure 9:
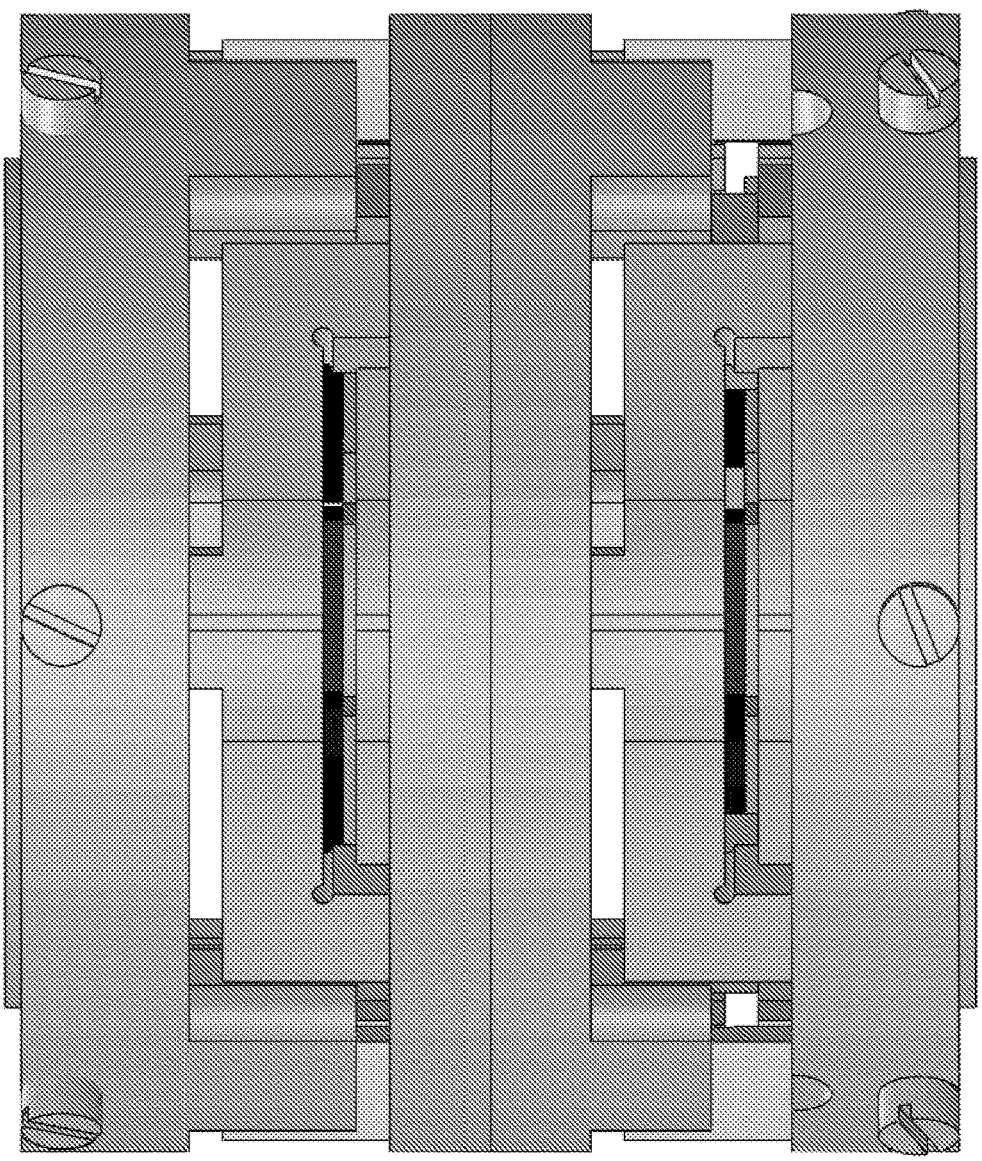
Figure 9:
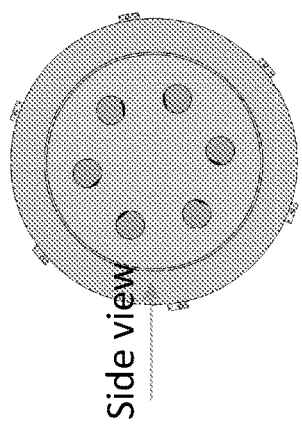
Figure 10:
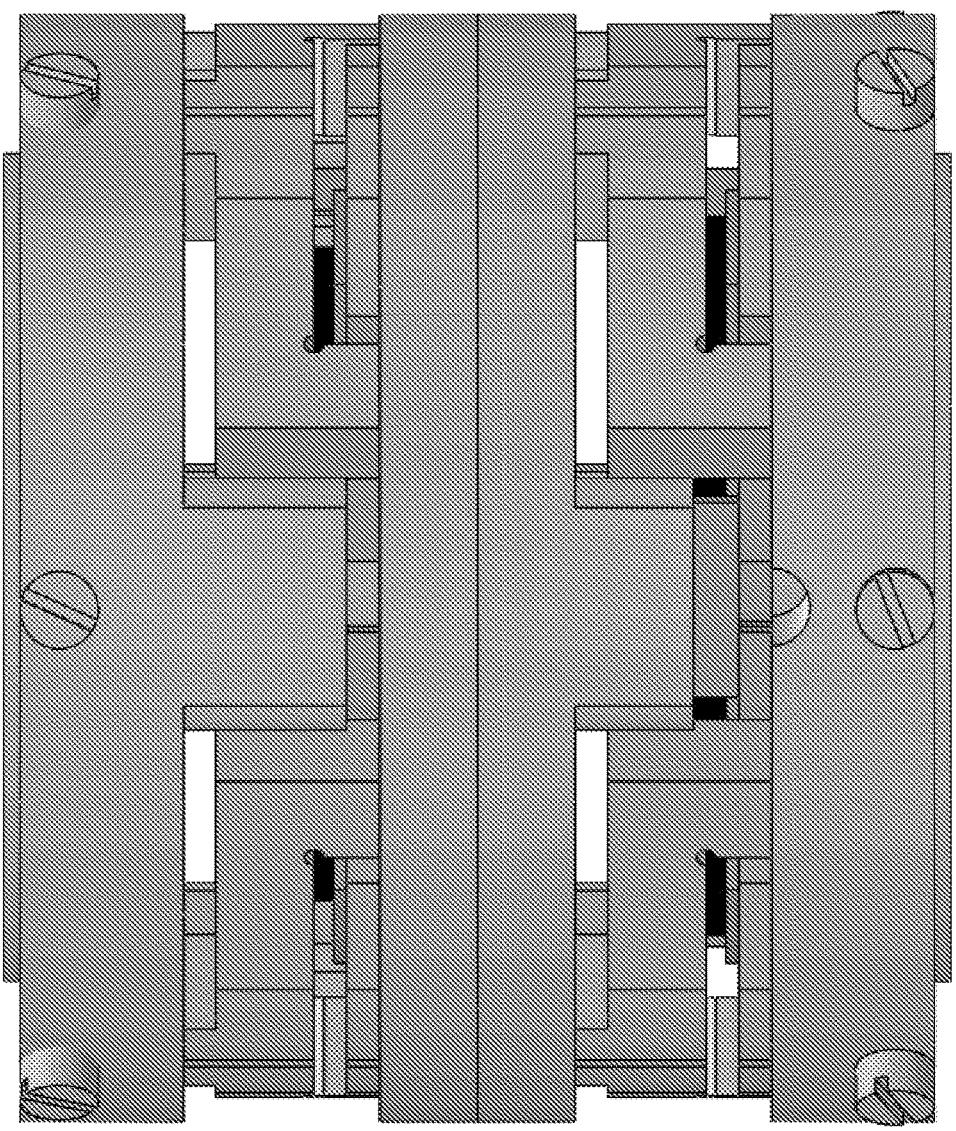
Figure 10:
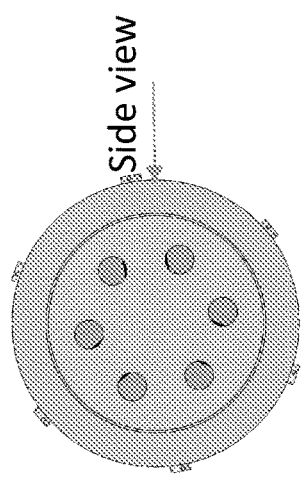

The force/torque measurable range can be determined by the spring coefficients k, which can be changed by adjusting the beams' properties: length L, width b, height h, and material elastic coefficient E, as shown in FIG. 4 and Equations 17 to 19

$$I = \frac{bh^3}{12} \quad (17)$$

$$\delta = \frac{fL^3}{48EI} \quad (18)$$

$$k = \frac{48EI}{L^3} \quad (19)$$

To convert the spring coefficients multiplied by six deflections to the voltages of each of the six optical sensors, the coefficients m should be measured by experiment as shown in Equations 20 to 25.

$$f_1 = k\delta_1 = m_1 v_1 \quad (20)$$

$$f_2 = k\delta_2 = m_2 v_2 \quad (21)$$

$$f_3 = k\delta_3 = m_3 v_3 \quad (22)$$

$$f_4 = k\delta_4 = m_4 v_4 \quad (23)$$

$$f_5 = k\delta_5 = m_5 v_5 \quad (24)$$

$$f_6 = k\delta_6 = m_6 v_6 \quad (25)$$

Finally, the stiffness matrix can be obtained $$\begin{bmatrix} F_x \\ F_y \\ F_z \\ M_x \\ M_y \end{bmatrix} = k \cdot v = \begin{bmatrix} k_{v11} & k_{v12} & k_{v13} & k_{v14} & k_{v15} & k_{v16} \\ k_{v21} & k_{v22} & k_{v23} & k_{v24} & k_{v25} & k_{v26} \\ k_{v31} & k_{v32} & k_{v33} & k_{v34} & k_{v35} & k_{v36} \\ k_{v41} & k_{v42} & k_{v43} & k_{v44} & k_{v45} & k_{v46} \\ k_{v51} & k_{v52} & k_{v53} & k_{v54} & k_{v55} & k_{v56} \end{bmatrix} \cdot \begin{bmatrix} v_1 \\ v_2 \\ v_3 \\ v_4 \\ v_5 \\ v_6 \end{bmatrix} \quad (26)$$

$$= \begin{bmatrix} \frac{-m_1 L_{3x}}{L_d} & 0 & \frac{m_3 L_{1x}}{L_d} & \frac{m_4 L_{3x}}{L_d} & 0 & \frac{-m_6 L_{1x}}{L_d} \\ \frac{m_1 L_{3y}}{L_d} & \frac{-m_2 L_{2y}}{L_d} & \frac{m_3 L_{1y}}{L_d} & \frac{-m_4 L_{3y}}{L_d} & \frac{m_5 L_{2y}}{L_d} & \frac{-m_6 L_{1y}}{L_d} \\ \frac{m_1}{2} & \frac{m_2}{2} & \frac{m_3}{2} & \frac{m_4}{2} & \frac{m_5}{2} & \frac{m_6}{2} \\ m_1 L_{3y} & -m_2 L_{2y} & m_3 L_{1y} & -m_4 L_{3y} & m_5 L_{2y} & -m_6 L_{1y} \\ -m_1 L_{3x} & 0 & m_3 L_{1x} & m_4 L_{3x} & 0 & -m_6 L_{1x} \end{bmatrix} \cdot$$

$$\begin{bmatrix} v_1 \\ v_2 \\ v_3 \\ v_4 \\ v_5 \\ v_6 \end{bmatrix}$$

Calibration

Figure 35:
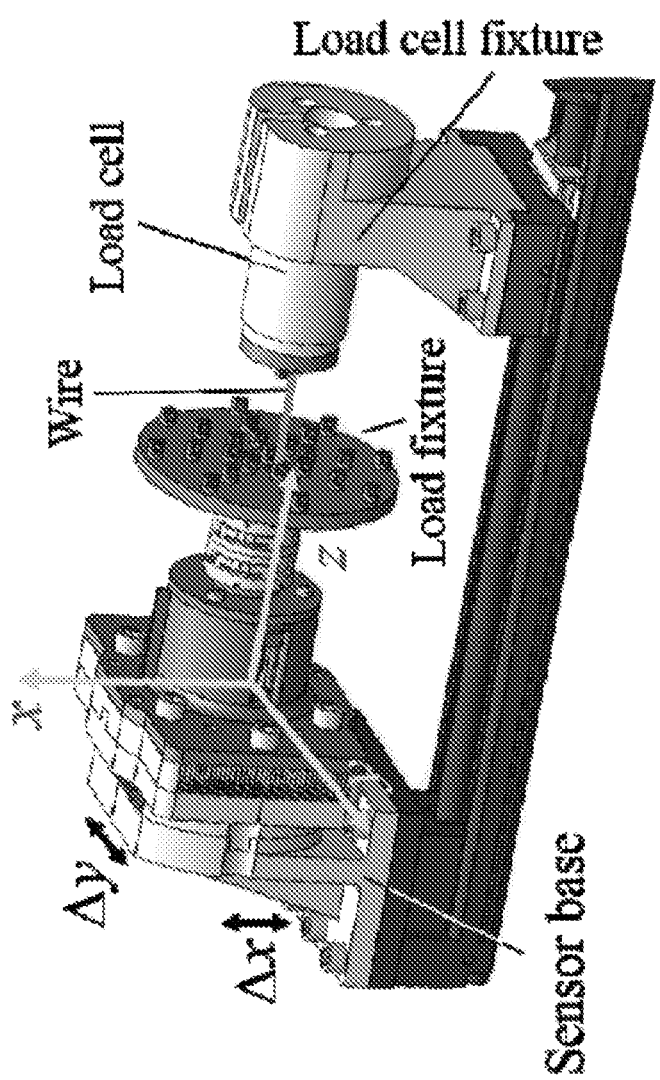
FIG. 35 is a drawing of a calibration apparatus used to aid in the calibration of a force sensor as provided by embodiments of the invention.

Calibration is an important step to convert the voltages of the optical sensors of the five-axis force/torque sensor to physical values (in our case, force/torque components), and find a calibration matrix which relates the output voltages the optical sensors to the physical values of the five-axis force/torque sensor. For this reason, a calibration device is presented that exerts force/torque conditions on the five-axis force/torque sensor to find the calibration matrix. The calibration device consists of a linear guide, a load fixture, a load cell (ATI Nano 17) with a fixture, and a sensor base (see FIG. 35). A variety of force/torque conditions can be applied to the five-axis force/torque sensor by pulling a wire along a linear motor system. Due to Newton's third law, the pulling forces are transmitted via the wire to the sensor (even if the wire might be extensible). At the same time, the output voltages of the five-axis force/torque sensor were recorded by an A/D converter (Analog-to-Digital converter). The calibration device can apply an amount of external force/torque components, such as a combination of Fx and My, or Fy and Mx. In addition, the calibration device can apply an amount of external force/torque components Fz, or a combination of Fz and Mx, or Fz and My.

Once calibration data has been obtained, it may be used to generate a 5×6 calibration or stiffness matrix, which converts the six output voltages from the optical sensors in the device to five physical values of force and torque. Therefore the matrix can be later on multiplied by any six element voltage vector (column) (see Equation 25) to obtain the sensor output.

Multiple Linear Regression (MLR) finds the relationship between two or more independent variables and a dependent variable by fitting a linear equation to the observed data [26]. In this implementation, every value of an independent variable, namely each value of the output voltage of the photo sensors of the five-axis force/torque sensor, is associated with a value of the dependent variables, i.e., the force and torque components Fx, Fy, Fz, Mx, and My. By applying MLR, the decoupling stiffness matrix (calibration matrix) is calculated as shown in Equations 26.

$$\begin{bmatrix} k_{v11} & k_{v12} & k_{v13} & k_{v14} & k_{v15} & k_{v16} \\ k_{v21} & k_{v22} & k_{v23} & k_{v24} & k_{v25} & k_{v26} \\ k_{v31} & k_{v32} & k_{v33} & k_{v34} & k_{v35} & k_{v36} \\ k_{v41} & k_{v42} & k_{v43} & k_{v44} & k_{v45} & k_{v46} \\ k_{v51} & k_{v52} & k_{v53} & k_{v54} & k_{v55} & k_{v56} \end{bmatrix} \times \begin{bmatrix} v_1 \\ v_2 \\ v_3 \\ v_4 \\ v_5 \\ v_6 \end{bmatrix} = \begin{bmatrix} F_x \\ F_y \\ F_z \\ M_x \\ M_y \end{bmatrix} \quad (25)$$

$$k = \begin{bmatrix} -11.0577 & 4.3205 & 1.6458 & 10.7029 & -1.3227 & -2.8698 \\ 5.4595 & 8.5276 & -4.7401 & -2.9240 & -9.8544 & 0.9312 \\ -0.4006 & -0.1695 & 1.0580 & -4.8603 & -4.5166 & -4.9457 \\ 0.7012 & 2.3349 & -2.4202 & 3.2485 & -6.6556 & 3.7957 \\ 6.1295 & -1.1886 & 1.4440 & -11.6688 & -0.7868 & 3.8449 \end{bmatrix} \quad (26)$$

These values of k can then be used in Equation (26) shown earlier to find Fx, Fy, Fz, Mx, and My from the measured voltages of the six optical detectors.

The first embodiment therefore provides a five-axis force sensor, but which, due to construction of the beams 102, 104, etc is not able to measure torque around the Z axis. The reason for this is that the beams are located in the X-Y plane of the sensor and are not particularly elastic along their length, a turning moment around the Z-axis is resisted by the beams, such that very little measurable deflection of any part of the sensor is obtained. In order to address this issue, the second embodiment of FIGS. 21 to 33 is provided, described next.

Within the second embodiment, with reference to FIGS. 21 to 33 the same stacked two element configuration is used, with upper and lower elements 300 and 400, as in the first embodiments. Likewise, each element 300 and 400 also comprises respective upper and lower rings 308, 310, and 408, 410, but this time instead of the respective upper and lower rings of each element being connected by symmetrically arranged pairs of beams, the respective upper and lower rings are connected by S-shaped resilient extensions 302, 304, 306, 402, 404, 406, that extend from the upper to the lower rings of each element. Three S shaped extensions are provided around the circumference of each element, with the S shaped extensions of each element (upper or lower) extending in the same "sense" around the element. By "sense" we mean for example that the S shaped extensions extends generally downwards from the upper ring to the lower ring from left to right, for example.

Importantly, however, the "sense" of each S shaped extension is opposite between the upper and the lower elements. Thus, for example, if in the upper element 300 the S shaped extensions 302, 304, 306 extend downwards from upper ring 308 to lower ring 310 from left to right, then in the lower element 400 the S-shaped extensions 402, 404, 406, should extend upwards from lower ring 410 to upper ring 408 from left to right (or downwards from right to left). Thus, from the upper element 300 to the lower element 400 the respective S shaped extensions extend in a mirror image to each other, about the plane formed from the junction between the upper ring 408 of the lower element 400 and the lower ring 310 of the upper element 300.

Apart from this difference that the beams 102, 102, 104, etc are replaced with the S shaped extensions 302, 304, 306, 402, 404, 406, the arrangement of the second embodiment is substantially the same as that of the first embodiment. For example, the same optical sensing techniques as described previously in respect of the first embodiment may be used, using the same optical sensor to measure the six displacements. Moreover, the sensor may be calibrated in a similar manner, but with the main difference that in the second embodiment the sensor is also able to measure torque about the Z axis, and hence a true six axis sensor measuring all of Fx, Fy, Fz, Mx, My, and Mz is obtained in a simple and small package.

The reason why Mz may also be measured in addition to Fx, Fy, Fz, Mx, and My is that the provision of the S shaped extensions in place of the horizontal beams of the first embodiment allows the sensor body to twist about the Z-axis in a controllable fashion. Moreover, the provision of the S-shaped extensions with opposite winding senses in the upper and lower elements means that whilst the whole structure can twist, the length dimension of the structure in the Z-axis is automatically compensated by the opposite reactions of the two mirror image S-shaped extensions in the respective upper and lower elements. That is, for any torque about the Z axis, the S-shaped extensions on one of the upper or lower elements will effectively stretch outwards, thus slightly reducing the Z-axis dimension of that element and bringing the upper and lower rings of that element closer together. However, because of the opposite winding sense of the S-shaped extensions on the other of the upper or lower elements those elements will have their ends move closer together and hence move the upper and lower rings of that element further apart along the Z-axis, thus balancing the loss of Z-axis dimension on the other element. The result is that the sensor structure as a whole is able to repeatedly twist about the Z-axis in a repeatable and measurable manner, thus allowing Mx to be measured, in addition to all the other forces and torques Fx, Fy, Fz, Mx, and My. Hence, a compact and durable six-axis sensor is obtained.

Figure 37:
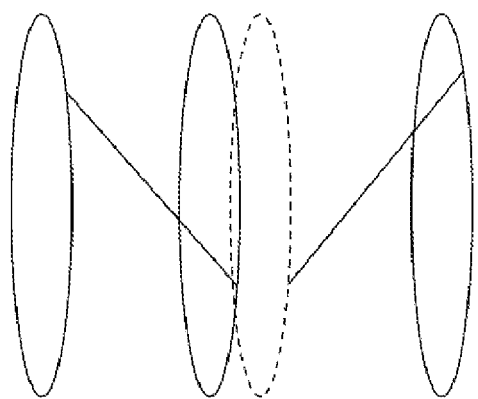
FIGS. 36 and 37 are example diagrams relating to variants of a second embodiment of the invention.
Figure 36:
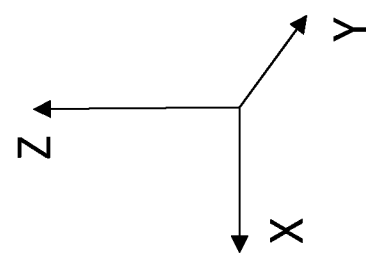
Figure 36:
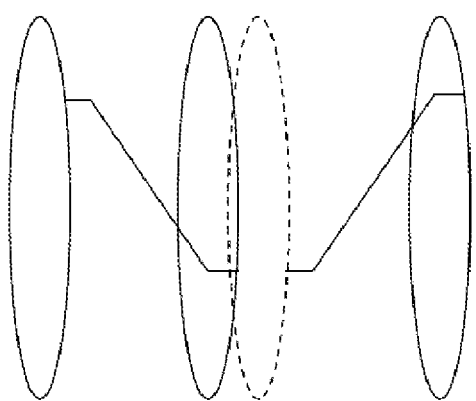

The above described benefit of the S-shaped extensions is due to the fact that the S-shaped extensions generally provide an obliquely extending extension that extends in a direction that changes in the X-Y plane of the sensor, but also in the Z direction, as shown in FIGS. 36 and 37. Whilst the described S shaped extensions are those of the specific embodiment described, in other variants of this embodiment slightly different other shapes, (for example, Z shapes, or straight lines) might be used, provided that there is a predominant diagonal or oblique component to the extension of the connecting beam between the upper and lower rings of each of the upper and lower elements, and that the winding sense of the extensions is opposite between the respective upper and lower elements. By providing the diagonal extensions (i.e. which extend in the X-Y plane around and parallel to the curve of the circumference of the upper and lower rings of the upper and lower elements, but which also extend in the Z axis), then turning moments about the Z-axis can be accommodated, as they result in the extension effectively bending under the turning moment, and either increasing or decreasing the Z-axis extension thereof depending on the direction of the turning moment and the winding sense of the direction. This increase or decrease in Z-axis extension can then be detected. Moreover, by providing the opposite winding senses for the respective oblique extensions of the upper and lower element, then as described above for any particular applied moment about the Z-axis then one of the upper or lower elements will extend in height along the z-direction, whilst the other will decrease in height, and hence overall Z-axis length of the sensor is generally maintained.

Regarding how six-axis force measurements may be obtained from the sensor of the second embodiment, the derivation of the signal processing described to obtain the measurements from the optical displacement measurements made from the optical sensors is described next with respect to FIGS. 38 to 40.

Figure 39:
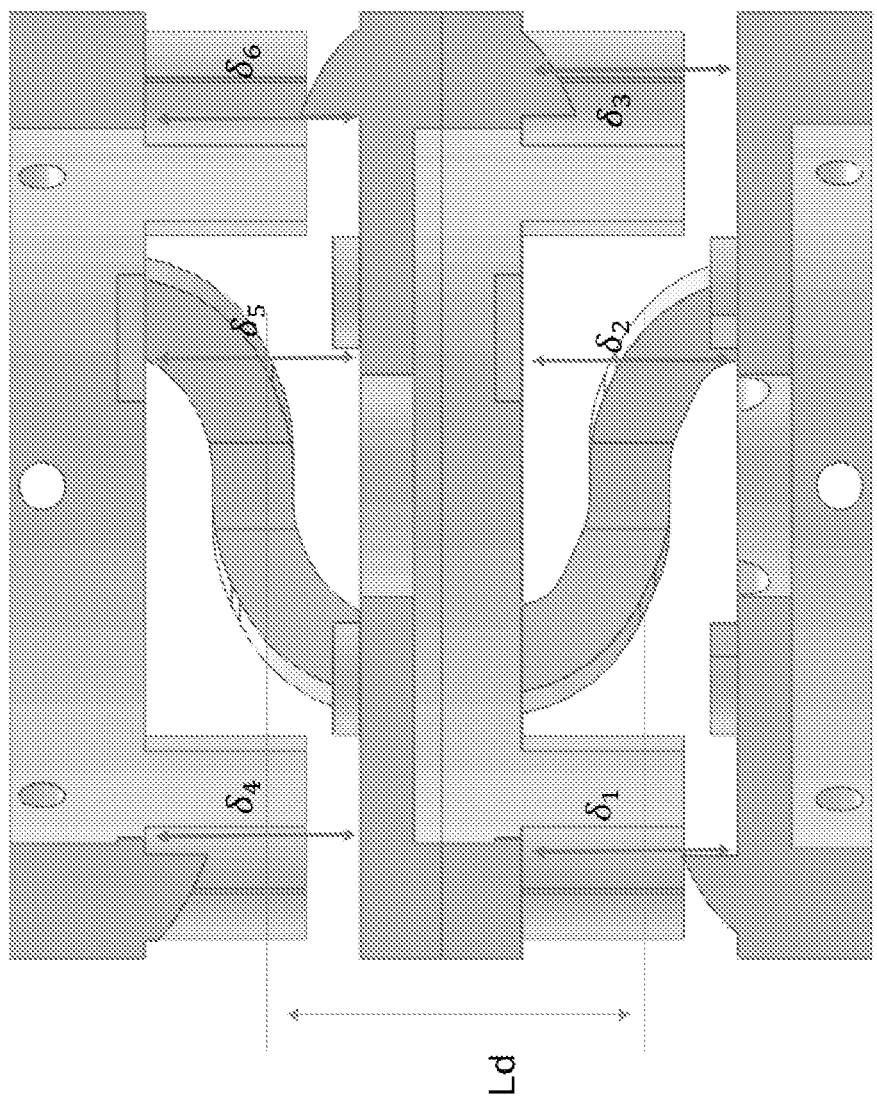
FIGS. 38 and 39 are drawings illustrating where measurements are made in the second embodiment of the invention.
Figure 38:
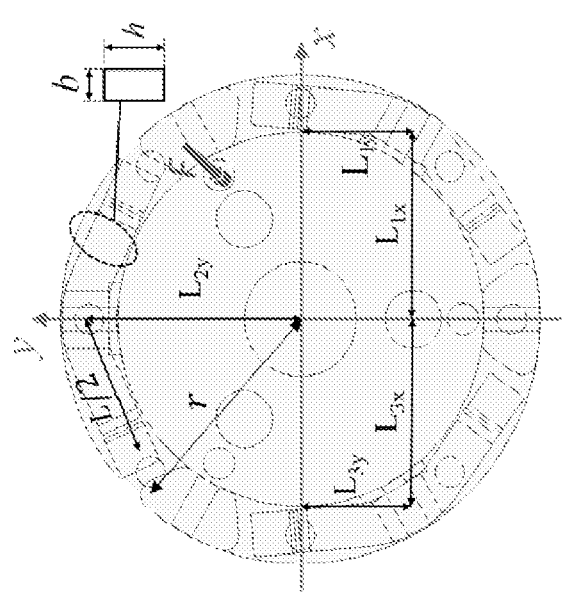

With reference to FIGS. 38 and 39, the sensor structure has six s shaped beams, from their deflections ($\delta_1$, $\delta_2$, $\delta_3$, $\delta_4$, $\delta_5$, and $\delta_6$), the force components ($f_1$, $f_2$, $f_3$, $f_4$, $f_5$, and $f_6$) can be calculated by multiplying the six deflections by spring coefficients k as shown in Equations. 2.1 to 2.6.

$$f_1 = k_1 \delta_1 \quad (2.1)$$

$$f_2 = k_2 \delta_2 \quad (2.2)$$

$$f_3 = k_3 \delta_3 \quad (2.3)$$

$$f_4 = k_4 \delta_4 \quad (2.4)$$

$$f_5 = k_5 \delta_5 \quad (2.5)$$

$$f_6 = k_6 \delta_6 \quad (2.6)$$

From these six force components, $F_z$, $M_{1x}$, $M_{2x}$, $M_{1y}$, $M_{2y}$, $M_x$, and $M_y$ can be calculated using Equations 7 to 12.

$$F_z = (f_1 + f_2 + f_3 + f_4 + f_5 + f_6)/2 \quad (2.7)$$

$$M_x = M_{2x} - M_{1x}, M_y = M_{2y} - M_{1y} \quad (2.8)$$

$$M_{1x} = -L_{2y} \cdot f_5 + L_{1y} \cdot f_6 + L_{3y} \cdot f_4 \quad (2.9)$$

$$M_{1y} = L_{1x} \cdot f_6 - L_{3x} \cdot f_4 \quad (2.10)$$

$$M_{2x} = -L_{2y} \cdot f_2 + L_{1y} \cdot f_3 + L_{3y} \cdot f_1 \quad (2.11)$$

$$M_{2y} = L_{1x} \cdot f_3 - L_{3x} \cdot f_1 \quad (12)$$

$$M_x = L_{3y} \cdot f_1 - L_{2y} \cdot f_2 + L_{1y} \cdot f_3 - L_{3y} \cdot f_4 + L_{2y} \cdot f_5 - L_{1y} \cdot f_6 \quad (2.13)$$

$$M_y = -L_{3x} \cdot f_1 + L_{1x} \cdot f_3 + L_{3x} \cdot f_4 - L_{1x} \cdot f_6 \quad (2.14)$$

The force components $F_x$ and $F_y$ are calculated by the difference of the two moment components divided by $L_d$ using Equations 2.15 and 2.16.

$$F_x = \frac{M_{2y} - M_{1y}}{L_d} \quad (2.15)$$
$$= \frac{-L_{3x} \cdot f_1 + L_{1x} \cdot f_3 + L_{3x} \cdot f_4 - L_{1x} \cdot f_6}{L_d}$$

$$F_y = \frac{M_{2x} - M_{1x}}{L_d} \quad (2.16)$$
$$= \frac{L_{3y} \cdot f_1 - L_{2y} \cdot f_2 + L_{1y} \cdot f_3 - L_{3y} \cdot f_4 + L_{2y} \cdot f_5 - L_{1y} \cdot f_6}{L_d}$$

The force/torque measurable range can be determined by the spring coefficients k, which can be changed by adjusting the beams' properties: length L, width b, height h, and material elastic coefficient E.

Figure 40:
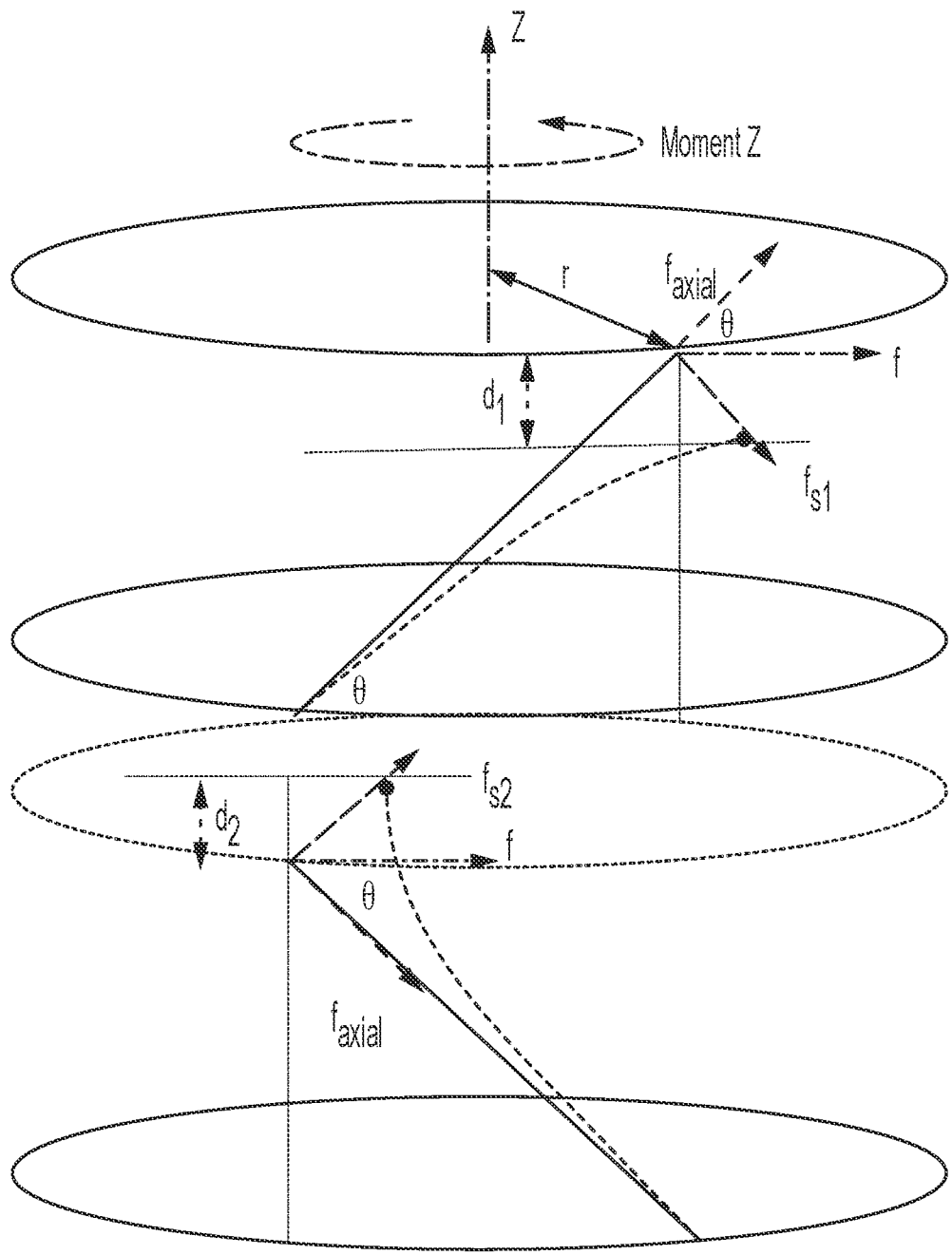
FIG. 40 is a diagram showing how turning moment about the Z-axis can be measured in embodiments of the invention.

In order to measure Mz, as described above in the second embodiment consideration of the s-shaped sensor structure can be simplified to simple inclined beams for the modelling of measurement of Mz, as shown in FIG. 40. When a turning moment Mz is applied to the structure, it is equivalent to applied same magnitude of shear forces, f, to all the supporting beams, where $$f = \frac{M_z}{3r}$$

Since the axial deformation of the beam is negligible, we only need to consider the lateral deflection of the beam for the give shear force, f. Assume the beam structure is modelled as a Euler-Bernoulli beam, the lateral force component, fs1, and the deflection in z axis d1, for the upper part can be computed as:

$$f_{s1} = f \sin\theta$$

$$d_1 = -\frac{f_{s1} L^3}{3EI} \cos\theta$$

Similarly, the lateral force component fs2, and the deflection in z axis d2, for the lower part can be computed as:

$$f_{s2} = f \sin\theta$$

$$d_2 = \frac{f_{s1} L^3}{3EI} \cos\theta$$

It is can be easily seen that d1=−d2.

Therefore, for a single pair of symmetrical beam structures, we can have $$d_2 - d_1 = \frac{2 M_z L^3 \sin\theta \cos\theta}{9EI}$$

Considering the 3-pair symmetrical beam structure of the embodiments described previously, the Mz can be computed as:

$$\frac{\sum \delta_{1,2,3} - \sum \delta_{4,5,6}}{3} = \frac{2M_z L^3 \sin\theta \cos\theta}{9EI}$$

$$M_z = \frac{3EI(\sum \delta_{1,2,3} - \sum \delta_{4,5,6})}{2L^3 \sin\theta \cos\theta}$$

As it can be seen from the above equation, the Mz is linearly related to the deflections, $\delta_{1, 2, \ldots 6}$. Therefore, in practice, we can create a linear matrix equation for expressing the six force and moment component with respect to the six deflections measurable by the optical sensors, as.

$$\begin{bmatrix} F_x \\ F_y \\ F_z \\ T_x \\ T_y \\ T_z \end{bmatrix} = K \begin{bmatrix} \delta_1 \\ \delta_2 \\ \delta_3 \\ \delta_4 \\ \delta_5 \\ \delta_6 \end{bmatrix}$$

Calibration of the six-axis sensor can be undertaken in a similar manner to that described above for the five axis sensor. As one example, the above equation may be calibrated as:

$$K = \begin{bmatrix} 9.550 & -8.964 & -0.997 & -10.600 & 2.717 & 7.510 \\ 4.631 & 5.907 & -10.686 & 2.557 & -10.243 & 8.033 \\ 6.431 & 6.549 & 6.444 & 6.695 & 6.630 & 6.610 \\ 4.075 & -0.097 & -4.122 & 6.589 & -12.801 & 6.464 \\ -2.297 & 4.690 & -2.343 & 10.973 & 0.153 & -11.225 \\ -9.050 & -9.308 & -9.275 & 9.248 & 8.870 & 9.349 \end{bmatrix}$$

to provide an operating six-axis sensor according to the second embodiment.

As described above, embodiments of the invention therefore provide light and compact 5-axis and 6-axis force sensors, which can be used in a variety of applications, and have numerous advantages. For example, in the describe embodiments the optical fibres and optoelectronic sensors are deployed along the circumference of the sensor structure. This simplifies manufacturing, makes the overall sensor size miniaturised, and secures an ample space in the centre of the sensor structure. This is in contrast with conventional six-axis force/torque sensors, where is hard to attach polyvinylidene fluoride (PVDF) films, strain gauges, piezoresistive materials, and fiber bragg grating (FBG) on the sensor structure, as it is hard to secure an ample space in the centre of the sensor structure.

Moreover the described sensor structures are adaptable to various robot mechanisms such as flexible manipulators or continuum manipulators driven by pneumatic pressure or tendon as well as conventional robot joints and end effectors. In addition, a ring-like sensor structure facilitates tendon or pneumatic pipes to be passed through, and the sensor itself can be used as a solid structure, by customizing the top and bottom attachments.

Additionally the described arrangements have advantages such as immunity to electrical noise, low power consumption, low-level noise, no need for electronic filtering, and low cost. In addition, recent technological advances allow diminutive sized photo sensors (NJL5901R-2, 1.0×1.4×0.6 mm$^3$) and submillimetre optical fibre (diameter 0.125 mm). Furthermore, today's 3D printing technologies allow low cost fabrication of miniaturised complex sensor structures in metal. Hence, the overall size of the sensors can be much smaller than commercially available force/torque sensors, seamlessly integrable into robot hands, surgical instruments, medical devices, haptic devices, catheters (2.5-4.0 mm), and tactile sensing elements, as shown in FIGS. 19 and 20.

Moreover, using the proposed fibre optic technology, the overall sensor size can be further miniaturized to around 2 mm diameter. Hence, catheters (2.0-2.5 mm), thick needles, and surgical instruments, surgical haptic systems, and pencils for tablet or phablet touch screens (drawing a painting delicately by a pencil needs its force/torque information) can be integrated, as shown in FIG. 20.

Various modifications may be made to the above described embodiments, to provide further embodiments. For example, in the above described embodiments the sensor structure deflection is measured using optical fiber sensors to detect the deflection from an applied force. However, in other embodiments different deflection or movement sensors may be used. For example, in other embodiments the deflection d may be measured indirectly, for example by attaching polyvinylidene fluoride (PVDF) films, strain gauges, piezoresistive materials, or fiber bragg gratings (FBG) on the beams. However, using optical sensors that make direct measurements based on light intensity using fiber optic, optoelectric, and camera based image processing technologies as described in the above embodiments, have advantages such as immunity to electrical noise, low power consumption, low-level noise, no need for electronic filtering, easy attachment into the sensor body, and low cost.

In addition, in the above described embodiments the stacked rings that make up the force sensor structures are circular in shape, but in other embodiments this need not necessarily be the case, and other shaped rings may be used in a stack as described to provide further embodiments. For example, the rings may be triangular, square, oval or elliptical, or any other polygonal or other shape. Whilst a circular shape provides a substantially uniform response to force from any radial direction, in some other embodiments a tuned directional response may be desired, which can be obtained by using a different shaped sensor. For example, a square shaped sensor stack will respond more easily to forces that come from directions that are orthogonal to the faces of the sensor, but would respond less to forces that come from radial directions that run through the corners of the square. In further embodiments of the invention, therefore, the rings may be other shapes than circular, and moreover different rings in the same stack that forms a force sensor according to the described embodiments may also be of different shapes.

Various further modifications, whether by way of addition, deletion, or substitution may be made to above mentioned embodiments to provide further embodiments, any and all of which are intended to be encompassed by the appended claims.

The invention claimed is:

1. A resilient structure for a six-axis force sensor, comprising:
    an upper sensor element and lower sensor element, the upper element being co-axially stacked on the lower element along a first axis;

the upper element comprising first upper and lower rings coaxially stacked along the first axis so as to be substantially parallel to each other in a first plane, the first upper and lower rings being connected to each other by a first plurality of resilient extensions resiliently mounted at a first end to the first upper ring and at a second end to the first lower ring, the first plurality of resilient extensions each having at least one portion that extends obliquely to the first plane in a first circumferential direction;

the lower element comprising second upper and lower rings coaxially stacked along the first axis so as to be substantially parallel to each other in the first plane, the second upper and lower rings being connected to each other by a second plurality of resilient extensions resiliently mounted at a first end to the second upper ring and at a second end to the second lower ring, the second plurality of resilient extensions each having at least one portion that extends obliquely to the first plane in a second circumferential direction;

the first and second circumferential directions being opposite to each other such that when a torque is applied about the first axis so as to cause the upper and lower elements to both twist about the first axis then one of the upper or lower elements lengthens in a first direction along the first axis, and the other of the upper or lower elements shortens in an opposite direction to the first direction along the first axis.

2. The resilient structure according to claim 1, wherein both the first and second circumferential directions have a same orthogonal component to the first plane.

3. The resilient structure according to claim 1, wherein the first plurality of resilient extensions and the second plurality of resilient extensions are either:
   i) substantially S shaped or Z shaped; or
   ii) straight beams.

4. The resilient structure according to claim 1, wherein the first plurality of resilient extensions and the second plurality of resilient extensions are equiangularly spaced around the respective upper and lower sensor elements.

5. The resilient structure according to claim 1, wherein the first plane is an X-Y plane, the upper sensor element and lower sensor element being stacked one on the other extending in the Z-direction, the resilient structure being able to deflect in response to applied forces in any of the X, Y, or Z directions, and in response to applied turning moments about any of the X, Y or Z axes.

6. The force sensor according to claim 1, wherein the first upper and lower rings and the second upper and lower rings may respectively be of any one or more of the following shapes:
   i) circular;
   ii) square or rectangular;
   iii) triangular;
   iv) polygonal; or
   v) oval or elliptical.

7. A force sensor, comprising:
   a resilient structure comprising:
      an upper sensor element and lower sensor element, the upper element being stacked on the lower element;
      the upper sensor element comprising first upper and lower rings substantially parallel to each other in a first plane, the first upper and lower rings being connected to each other by a first plurality of resilient extensions resiliently mounted at a first end to the first upper ring and at a second end to the first lower ring, the resilient extensions having at least one portion that extends obliquely to the first plane in a first circumferential direction;
      the lower sensor element comprising second upper and lower rings substantially parallel to each other in the first plane, the second upper and lower rings being connected to each other by a second plurality of resilient extensions resiliently mounted at a first end to the second upper ring and at a second end to the second lower ring, the resilient extensions having at least one portion that extends obliquely to the first plane in a second circumferential direction;
      the first and second circumferential directions being opposite to each other; and
   displacement detection circuitry arranged to detect deflection or movement of the upper or lower sensor elements under an applied force to be sensed.

8. The force sensor according to claim 7, wherein the displacement detection circuitry comprises a plurality of optical sensors located within the upper and lower sensor elements.

9. The force sensor according to claim 8, wherein the optical sensors comprise optical sources and reflectors mounted on the structure, the sensors being arranged to detect displacements of the reflectors with respect to the sources due to movement of the structure under an applied force or torque.

10. The force sensor according to claim 7, the arrangement being such that the lengthening of the first element and the shortening of the second element are substantially equal.

* * * * *